(12) United States Patent
Sheng et al.

(10) Patent No.: US 12,362,124 B2
(45) Date of Patent: Jul. 15, 2025

(54) BRAZING STRUCTURE, BRAZING METHOD, AND X-RAY TUBE

(71) Applicant: WUHAN UNITED IMAGING HEALTHCARE CO., LTD., Hubei (CN)

(72) Inventors: Qingqing Sheng, Wuhan (CN); Xinxing Ma, Wuhan (CN); Shandong Peng, Wuhan (CN)

(73) Assignee: WUHAN UNITED IMAGING HEALTHCARE CO., LTD., Wuhan (CN)

( * ) Notice: Subject to any disclaimer, the term of this patent is extended or adjusted under 35 U.S.C. 154(b) by 395 days.

(21) Appl. No.: 17/821,183

(22) Filed: Aug. 21, 2022

(65) Prior Publication Data

US 2023/0059451 A1     Feb. 23, 2023

(30) Foreign Application Priority Data

Aug. 20, 2021 (CN) .......................... 202110961244.6
Aug. 20, 2021 (CN) .......................... 202110962222.1

(51) Int. Cl.
| | |
|---|---|
| *H01J 9/18* | (2006.01) |
| *B23K 1/00* | (2006.01) |
| *B23K 3/08* | (2006.01) |
| *B23K 101/36* | (2006.01) |
| *H01J 35/08* | (2006.01) |

(52) U.S. Cl.
CPC .............. *H01J 9/18* (2013.01); *B23K 1/0016* (2013.01); *B23K 3/087* (2013.01); *H01J 35/08* (2013.01); *B23K 2101/36* (2018.08); *H01J 2235/084* (2013.01)

(58) Field of Classification Search
None
See application file for complete search history.

(56) References Cited

U.S. PATENT DOCUMENTS

| | | |
|---|---|---|
| 6,430,264 B1 | 8/2002 | Lee |
| 6,463,125 B1 | 10/2002 | Minas et al. |
| 2004/0136499 A1 | 7/2004 | Holland et al. |

FOREIGN PATENT DOCUMENTS

| | | |
|---|---|---|
| CN | 204946855 U | 1/2016 |
| CN | 208548335 U | 2/2019 |

(Continued)

OTHER PUBLICATIONS

First Office Action in Chinese Application No. 202110962222.1 mailed on Dec. 28, 2023, 19 pages.

(Continued)

*Primary Examiner* — Edwin C Gunberg
(74) *Attorney, Agent, or Firm* — METIS IP LLC

(57) ABSTRACT

The present disclosure relates to a brazing structure. The brazing structure may comprise a first portion and a second portion. At least one of the first portion or the second portion may include a connection-reinforcing surface. The connection-reinforcing surface may include a groove region and a filler placement region. The filler placement region may be configured to hold a filler material in solid state before brazing. The groove region may include a plurality of grooves where the filler material flows into after being melted. The first portion and the second portion may be connected by a braze joint formed by the filler material.

20 Claims, 13 Drawing Sheets

(56) References Cited

FOREIGN PATENT DOCUMENTS

| | | |
|---|---|---|
| CN | 208551254 U | 3/2019 |
| CN | 110556278 A | 12/2019 |
| JP | H0835747 A | 2/1996 |
| JP | 2004292233 A | 10/2004 |
| JP | 2005174989 A | 6/2005 |
| JP | 2007005607 A | 1/2007 |
| JP | 2010244712 A | 10/2010 |
| JP | 2022040843 A * | 3/2022 |

OTHER PUBLICATIONS

First Office Action in Chinese Application No. 202110961244.6 mailed on Dec. 28, 2023, 21 pages.

* cited by examiner

12000

```
Placing a filler material in solid state in a filler
placement region of a brazing structure, wherein a shape      ~ 12100
of the filler material in solid state matches a shape of the
filler placement region
```

```
Heating at least one of the filler material, a first portion of
the brazing structure, or a second portion of the brazing       ~ 12200
structure to melt the filler material, wherein the melted filler
material is allowed at least to flow into a groove region
along a plurality of grooves
```

```
Cooling the melted filler material, the first portion of
the brazing structure, and the second portion of the           ~ 12300
brazing structure so as to allow the filler material to
solidify to form a braze joint to connect the first portion
and the second portion
```

FIG. 12

BRAZING STRUCTURE, BRAZING METHOD, AND X-RAY TUBE

CROSS-REFERENCE TO RELATED APPLICATIONS

This application claims priority of Chinese Patent Application No. 202110962222.1, filed on Aug. 20, 2021, and Chinese Patent Application No. 202110961244.6, filed on Aug. 20, 2021, the contents of each of which are hereby incorporated by reference.

TECHNICAL FIELD

This disclosure generally relates to the art of brazing, and more particularly, relates to a brazing structure, a brazing method, and an X-ray tube including the brazing structure.

BACKGROUND

Brazing refers to a metal-joining process in which two or more metal items are connected by melting a filler material (e.g., a brazing alloy) in solid state to liquid state so that the filler material flows into and fills a gap between the two or more metal items and connect the two or more metal items when the filler material cools down and solidifies. Taking vacuum brazing as an example, the vacuum brazing is a kind of operation in the art of brazing. In a vacuum brazing, a filler material may be held between two components to be brazed (e.g., two components), and the filler material and the components to be brazed may be heated in a vacuum heating chamber so as to prevent the heated filler material and the components to be brazed from being oxidized or burned in the air.

SUMMARY

An aspect of the present disclosure provides a brazing structure. The brazing structure may comprise a first portion and a second portion. At least one of the first portion or the second portion may include a connection-reinforcing surface. The connection-reinforcing surface may include a groove region and a filler placement region. The filler placement region may be configured to hold a filler material in solid state before brazing. The groove region may include a plurality of grooves where the filler material flows into after being melted. The first portion and the second portion may be connected by a braze joint formed by the filler material.

In some embodiments, the groove region may include a first groove region. The first groove region may include a plurality of first grooves. The first groove region may surround the filler placement region, or the filler placement region may surround the first groove region. At least one end of at least one of the plurality of first grooves may be located at an edge of the first groove region that abuts the filler placement region.

In some embodiments, the first groove region may be of an annular shape having an inner edge and an outer edge, and two ends of the at least one of the plurality of first grooves may be located at the inner edge and the outer edge of the first groove region, respectively.

In some embodiments, the first groove region may be of a circular-ring shape, and each of the at least one of the plurality of first grooves may extend along a radial direction of the first groove region.

In some embodiments, each of the at least one of the plurality of first grooves is of a shape of a straight line, an arc, a curve, or a zigzag line.

In some embodiments, the at least one of the first portion or the second portion may include a first through-hole, and a first opening of the first through-hole may be located on the connection-reinforcing surface.

In some embodiments, the filler placement region may be of an annular shape having an inner edge and an outer edge. The filler placement region may be configured to surround the first opening, and the first groove region may be configured to surround the filler placement region. A first end of each of the plurality of first grooves may be located at the outer edge of the filler placement region, and a second end of the each of the plurality of first grooves may be located at an outer edge of the connection-reinforcing surface.

In some embodiments, the filler placement region may be of an annular shape having an inner edge and an outer edge. The first groove region may be configured to surround the first opening, and the filler placement region may be configured to surround the first groove region. A first end of each of the plurality of first grooves may be located at an edge of the first opening, and a second end of the each of the plurality of first grooves may be located at the inner edge of the filler placement region.

In some embodiments, the connection-reinforcing surface may include a blocking component. The blocking component may be arranged along an edge of the filler placement region that is away from the first groove region.

In some embodiments, the groove region may include a second groove region that is of an annular shape having an inner edge and an outer edge. The second groove region may include a plurality of second grooves, and two ends of at least one of the plurality of second grooves may be located at the inner edge and the outer edge of the second groove region, respectively. The second groove region may be configured to surround the filler placement region. A first end of each of the plurality of second grooves may be located at the outer edge of the filler placement region, a second end of the each of the plurality of second grooves is located at an outer edge of the connection-reinforcing surface.

In some embodiments, the second groove region may be of a circular-ring shape, and at least one of the plurality of second grooves may extend along a radial direction of the second groove region.

In some embodiments, at least one of the plurality of second grooves may be of a shape of a straight line, an arc, a curve, or a zigzag line.

In some embodiments, a sum of an area of the first groove region and an area of the second groove region may be greater than or equal to 40% of an area of the connection-reinforcing surface.

In some embodiments, the filler placement region may be of a circular shape having an outer edge. The first groove region may be configured to surround the filler placement region. A first end of each of the plurality of first grooves may be located at the outer edge of the filler placement region, and a second end of the each of the plurality of first grooves may be located at an outer edge of the connection-reinforcing surface.

In some embodiments, the groove region may include a third groove region. The third groove region may include a plurality of third groove sub-regions. The filler placement region may include a plurality of filler placement sub-regions, and the plurality of filler placement sub-regions may be arranged at intervals such that each pair of adjacent filler placement sub-regions may be spaced apart by one of the plurality of third groove sub-regions. Each of the plurality of third groove sub-regions may include a plurality of third grooves, and two ends of at least one of the plurality of third grooves may be located at two edges of the third groove sub-region that abut the pair of adjacent filler placement sub-regions, respectively.

In some embodiments, the plurality of filler placement sub-regions may be arranged at intervals along a circumferential direction of the brazing structure.

In some embodiments, the at least one of the plurality of third grooves of one of the plurality of third groove sub-regions may extend along a radial direction of the brazing structure.

In some embodiments, the at least one of the plurality of third grooves may be of a shape of a straight line, an arc, a curve, or a zigzag line.

In some embodiments, the filler placement region may include the plurality of third grooves.

In some embodiments, at least one of the first portion or the second portion may include a second through-hole. A second opening of the second through-hole may be located on the connection-reinforcing surface.

In some embodiments, the third groove region and the filler placement regions may be configured to form an annular region that surrounds the second opening.

In some embodiments, a center of the annular region may coincide with a center of the connection-reinforcing surface.

In some embodiments, a blocking component may be arranged along at least one of an edge of the second opening or an outer edge of the connection-reinforcing surface.

In some embodiments, the connection-reinforcing surface may include a fourth groove region. The fourth groove region may be of an annular shape and may include a plurality of fourth grooves. At least one of the plurality of fourth grooves may be of an annular shape that surrounds an inner edge of the fourth groove region. The fourth groove region may be configured to surround the annular region.

In some embodiments, the at least one of the plurality of fourth grooves may extend along a circumferential direction of the brazing structure.

In some embodiments, a sum of an area of the third groove region and an area of the fourth groove region may be greater than or equal to 40% of an area of the connection-reinforcing surface.

In some embodiments, the groove region may include a fifth groove region. The fifth groove region may be of an annular shape and may include a plurality of fifth grooves. At least one of the plurality of fifth grooves may be of an annular shape that surrounds an inner edge of the fifth groove region. The third groove region and the filler placement region may be configured to form an annular region. The fifth groove region may be configured to surround the second opening. The annular region may be configured to surround the fifth groove region.

In some embodiments, the at least one of the plurality of fifth grooves may extend along a circumferential direction of the brazing structure.

In some embodiments, the groove region may include a sixth groove region. The sixth groove region may be of an annular shape and may include a plurality of sixth grooves. At least one of the plurality of sixth grooves may be of an annular shape that surrounds an inner edge of the sixth groove region. The sixth groove region may be configured to surround the annular region.

In some embodiments, the at least one of the plurality of sixth grooves may extend along the circumferential direction of the brazing structure.

In some embodiments, a sum of an area of the third groove region, the fifth groove region, and the sixth groove region may be greater than or equal to 40% of an area of the connection-reinforcing surface.

In some embodiments, areas of at least two of the plurality of filler placement sub-regions may be equal.

In some embodiments, the intervals between at least two pairs of the plurality of filler placement sub-regions may be of a same dimension along the circumferential direction of the brazing structure.

In some embodiments, the connection-reinforcing surface may be of a circular shape. At least one of the plurality of filler placement sub-regions may be of a sector-ring shape, and a center of the sector-ring shape may coincide with a center of the connection-reinforcing surface.

In some embodiments, the anode target plate may include a brazing structure mentioned above.

Another aspect of the present disclosure provides An X-ray tube. The X-ray tube may comprise an anode target plate. The anode target plate may include a brazing structure mentioned above.

In some embodiments, the first portion of the brazing structure may provide a substrate of the anode target plate. The second portion of the brazing structure may provide a base body.

Another aspect of the present disclosure further provides a method for connecting a brazing structure by brazing. The brazing structure may include a first portion and a second portion. At least one of the first portion or the second portion may include a connection-reinforcing surface. The connection-reinforcing surface may include a groove region and a filler placement region. The filler placement region may be configured to hold a filler material in solid state before brazing, and the groove region may include a plurality of grooves. The method may include placing the filler material in solid state in the filler placement region. The method may also include heating at least one of the filler material, the first portion of the brazing structure, or the second portion of the brazing structure to melt the filler material. The method may further include allowing the melted filler material to flow into the groove region along the plurality of grooves so as to form a braze joint to connect the first portion and the second portion.

In some embodiments, the filler material may include at least one of zirconium, manganese, or nickel, or an alloy thereof.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 12 is a flowchart illustrating a brazing process for generating a brazing structure according to some embodiments of the present disclosure.

Figure 1:
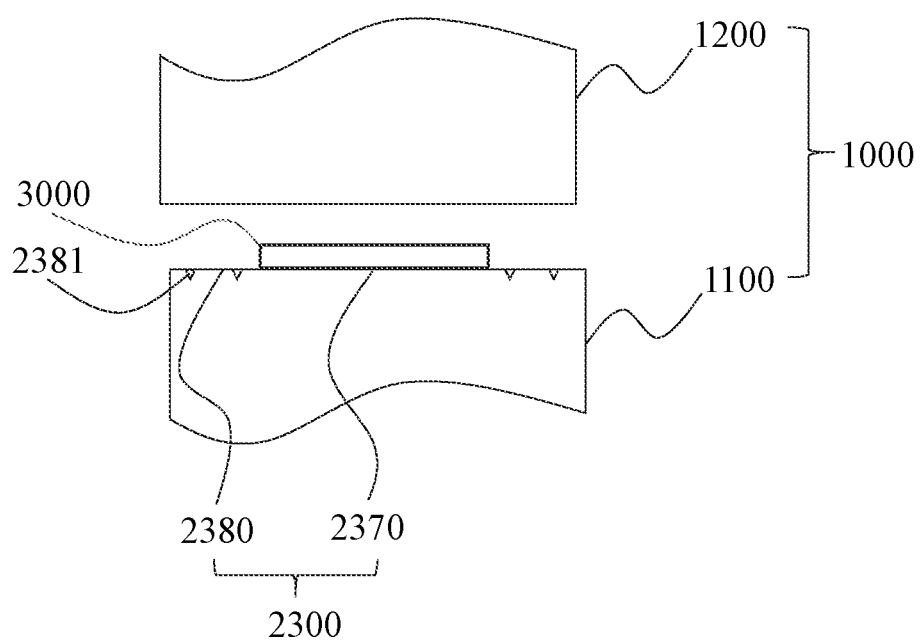
FIG. 1 is a schematic diagram illustrating an exemplary brazing structure according to some embodiments of the present disclosure.

Illustrations of the reference numerals in the drawings are as follows: 1000 refers to a brazing structure, 1100 refers to a first portion, 1200 refers to a second portion, 2000 refers to an anode target plate, 2100 refers to a base body, 2200 refers to a substrate, 2300 refers to a connection-reinforcing surface, 2310 refers to a first groove region, 2311 refers to a first groove, 2312 refers to an inner edge, 2313 refers to an outer edge, 2320 refers to a second groove region, 2321 refers to a second groove, 2330 refers to a third groove region, 2331 refers to a third groove, 2335 refers to a third groove sub-region, 2340 refers to a fourth groove region, 2341 refers to a fourth groove, 2350 refers to a fifth groove region, 2351 refers to a fifth groove, 2360 refers to a sixth groove region, 2341 refers to a sixth groove, 2370 refers to a filler placement region, 2375 refers to a filler placement sub-region, 2380 refers to a groove region, 2381 refers to a groove, 2400 refers to a through-hole, 2410 refers to a first through-hole, 2420 refers to a second through-hole, 2411 refers to a first opening, 2421 refers to a second opening, 2500 refers to a bulging rim, 3000 refers to a filler material, and 4000 refers to an anode rotor.

DETAILED DESCRIPTION

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Brazing may refer to a metal-joining process in which two or more components (including, e.g., a metal, or a metal alloy), or referred to as brazing components, are connected by melting a filler material (e.g., a brazing alloy) in solid state to liquid state so that the filler material flows into and fills a gap between the two or more brazing components and connect the two or more brazing components when the filler material cools down and solidifies. The melting point of the filler material may be below a melting point of each of the two or more brazing components. In some embodiments, a connection surface of one or more brazing components may include a plurality of grooves to achieve a more stable connection between the brazing components. The filler material may be held on the connection surface including the plurality of grooves during a brazing operation, so that the filler material in liquid state may flow into the plurality of grooves. The filler material may be sucked in and fill the gaps of the brazing components under a capillary action to allow a stable connection between the brazing components. However, since the filler material is held on the plurality of grooves, after the filler material in solid state is melted, air in the plurality of grooves may be trapped and air bubbles may appear at a braze joint, which causes unsatisfactory improvement of connection reliability between the brazing components.

Figure 2:
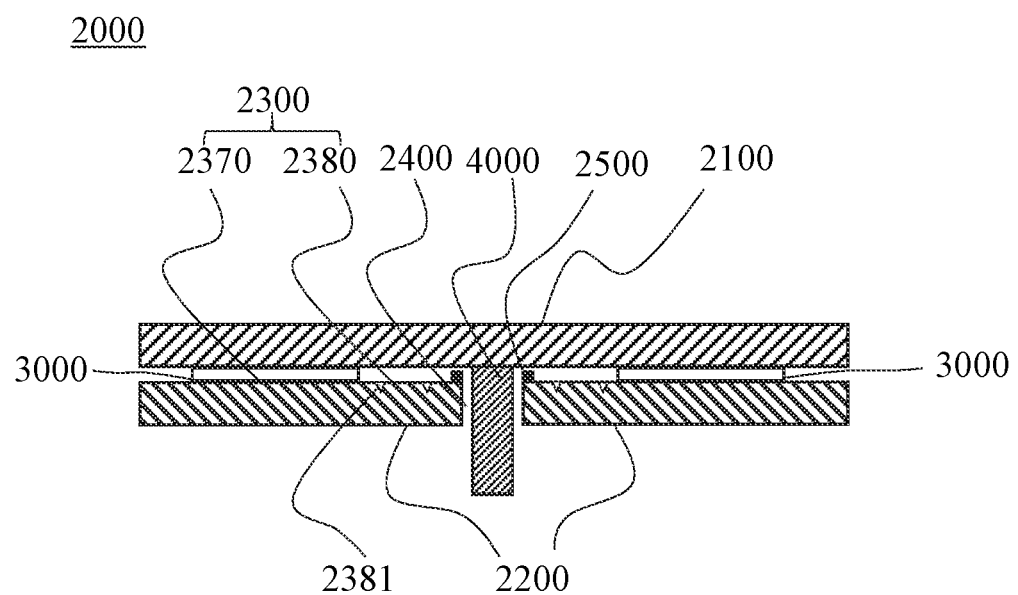
FIG. 2 is a schematic diagram illustrating an exemplary anode target plate according to some embodiments of the present disclosure.

In an aspect, the present disclosure is directed to a brazing structure. In some embodiments, the brazing structure may include at least two portions, for example, a first portion and a second portion. One of the least two portions may include a connection-reinforcing surface. The connection-reinforcing surface may include a groove region and a filler placement region. The filler placement region may be configured to hold a filler material in solid state. The groove region may generate a capillary action on the filler material in liquid state after the filler material in solid state is melted. The filler placement region does not coincide with the groove region. Or the filler placement region does not completely coincide with the groove region. The groove region may include a plurality of grooves. The filler material in solid state on the filler placement region may be melted and flow into the groove region and flow along the plurality of grooves. During the filler material in liquid state flows long the plurality of grooves, the air in the plurality of grooves may be pushed out of the gap between the first portion and the second portion, thereby reducing the probability of generating air bubbles in the braze joint and improving the reliability of the connection between different portions of the brazing structure. The plurality of grooves may increase a brazing area to improve the stability of the brazing structure. The brazing area of a brazing structure may refer to a surface area of the region where the filler material is distributed for forming a braze joint in the brazing structure. In some embodiments, the brazing structure may be an anode target plate of an X-ray tube (as shown in FIG. 2). In some embodiments, the brazing structure may be a hard alloy cutter head, a drilling bit, a heat exchanger, a microwave waveguide component, an electronic vacuum device, or the like. In some embodiments, the brazing structure may be produced through vacuum brazing.

FIG. 1 is a schematic diagram illustrating an exemplary brazing structure 1000 according to some embodiments of the present disclosure. As shown in FIG. 1, the brazing structure 1000 may include a first portion 1100 and a second portion 1200. At least one of the first portion 1100 and the second portion 1200 may include a connection-reinforcing surface 2300 that is configured to reinforce the connection between the first portion 1100 and the second portion 1200. The connection-reinforcing surface 2300 may include a filler placement region 2370 and a groove region 2380. The filler placement region 2370 may be configured to hold a filler material 3000 in solid state. The groove region may include a plurality of grooves 2381.

A plurality of relative positions may be arranged between the groove region 2380 and the filler placement region 2370. Additionally or alternatively, the plurality of grooves 2381 may include a plurality of extending directions. More details may refer to the following examples. The filler material 3000 in solid state may be in liquid state after the filler material 3000 in solid state is melted. The melted filler material (i.e., the filler material in solid state is basically in liquid state after the filler material is melted) may flow from the filler placement region 2370 to the groove region 2380, and the filler material 3000 in liquid state may flow in the plurality of grooves 2381, so that the air in the plurality of grooves 2381 may be pushed out. A space between the first portion 1100 and the second portion 1200 may be filled with the filler material 3000. The first portion 1100 may be connected to the second portion 1200 via the filler material 3000.

In some embodiments, according to a specific shape of the filler material 3000 in solid state, at least a part of the filler material 3000 in solid state may be held on the groove region 2380. Merely as an example, when the filler material 3000 in solid state is held on the filler placement region 2370, a part of the filler material 3000 in solid state may be held on the groove region 2380 across an edge of the filler placement region 2370.

The first portion 1100 and the second portion 1200 may include connection surfaces for connection. The connection surface of the first portion 1100 or the second portion 1200 may be the connection-reinforcing surface 2300 that is configured to increase a connection strength. The groove region 2380 arranged on the connection-reinforcing surface 2300 may increase the connection strength between the first portion 1100 and the second portion 1200, thereby improving the connection stability between the first portion 1100 and the second portion 1200. The connection-reinforcing surface 2300 may be a surface of the first portion 1100 that is opposite to the second portion 1200 when the first portion 1100 is connected to the second portion 1200. That is, the connection-reinforcing surface 2300 may be one of the two connection surfaces for connection, and the connection surface may include the groove region 2380 and the filler placement region 2370 to achieve an effect of increasing the connection strength. After the filler material 3000 in liquid state flows from the filler placement region 2370 into the plurality of grooves 2381 of the groove region 2380, the filler material 3000 may be cooled, so that the filler material 3000 in liquid state may be changed into solid state to form a braze joint between the first portion 1100 and the second portion 1200. More details about the groove region 2380 and the filler placement region 2370 may be found elsewhere in the present disclosure. See, e.g., FIGS. 2-11 and relevant descriptions thereof.

Figure 10:
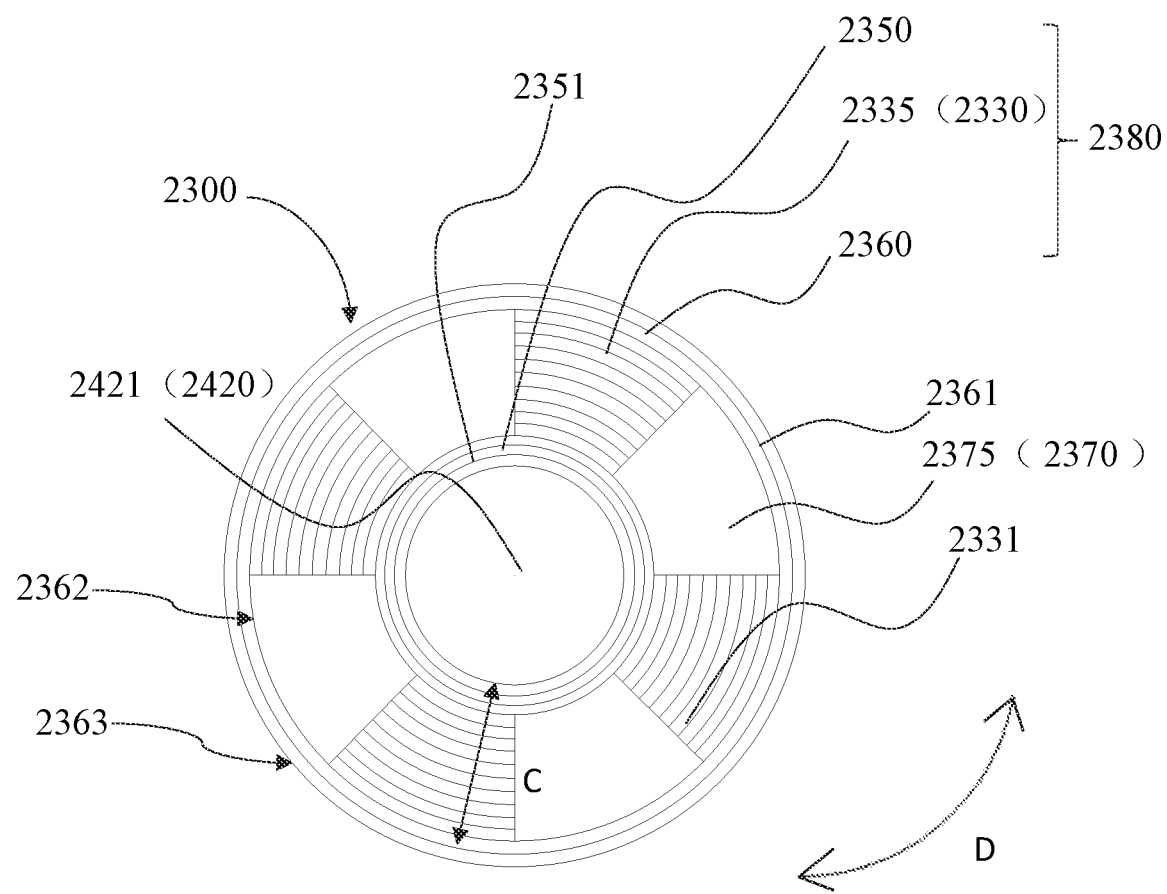
FIG. 10 is a schematic diagram illustrating an exemplary connection-reinforcing surface according to some embodiments of the present disclosure.

In some embodiments, the connection-reinforcing surface 2300 may include one or more groove regions 2380. For example, refer to FIG. 5 and the related descriptions, a count of the groove regions 2380 may be two. The groove region 2380 may include a first groove region 2310 and a second groove region 2320. In some embodiments, the connection-reinforcing surface 2300 may include one or more filler placement sub-regions 2375. For example, as illustrated in FIG. 10, the filler placement region 2370 on the connection-reinforcing surface 2300 may include four filler placement sub-regions 2375.

In some embodiments, an anode target plate 2000 of an X-ray tube (shown in FIG. 2) may include the brazing structure. Since a working environment temperature is relatively high when producing the anode target plate 2000, and the anode target plate 2000 needs to rotate at high speed during use, the connection reliability of each component of the anode target plate 2000 may be ensured through connecting the components (e.g., a base body 2100 and a substrate 2200) of the anode target plate 2000 via the brazing structure, thereby ensuring a stable working of the anode target plate 2000 and extending the service life of the anode target plate 2000. More details about the structure of the anode target plate 2000 may be found in FIG. 2 and relevant descriptions thereof.

FIG. 2 is a schematic diagram illustrating an exemplary anode target plate according to some embodiments of the present disclosure. In some embodiments, the first portion 1100 may include a substrate 2200, and the second portion 1200 may include a base body 2100. In some embodiments, the connection-reinforcing surface 2300 may be arranged on the substrate 2200, which is conducive to processing the plurality of grooves 2381, thereby improving the processing efficiency of the anode target plate 2000. In some embodiments, the connection-reinforcing surface 2300 may be arranged on the base body 2100.

In some embodiments, the substrate 2200 may include graphite. It may be convenient to process the plurality of grooves 2381 on the substrate 2200 made of graphite, and therefore the processing efficiency of the anode target plate 2000 may be improved. In some embodiments, the substrate 2200 may include oxygen-free copper. In some embodiments, the base body 2100 may be a metal base body. In some embodiments, the base body 2100 may include refractory metal. The refractory metal may refer to rare metal monomers or metal alloys with higher melting points (e.g., a melting point higher than 1650° C.). The refractory metal may include tungsten, molybdenum, niobium, tantalum, vanadium, zirconium, rhenium, hafnium, or the like. The refractory metal may include alloy, such as tantalum-tungsten alloy, molybdenum-titanium-zirconium alloy, or the like.

In some embodiments, the base body 2100 and the substrate 2200 may be of a column shape, such as a shape of cylinder, a shape of elliptical cylinder, or the like. The connection-reinforcing surface 2300 may be of a circular shape, an oval shape, or a portion thereof. An axis of the base body 2100 may (substantially) coincide with an axis of the substrate 2200. During the working an X-ray tube, the base body 2100 and the substrate 2200 may rotate around the axes of the base body 2100 and the substrate 2200. As used herein, "substantially/basically," when used to describe a features (e.g., substantially coincident, substantially equal) indicates that a deviation of the feature is below a threshold. The threshold may be an absolute value (e.g., 1 cm, 5 mm), or a relative value. For instance, when the base body is a circle, the threshold may be 10% or 5% of a radius of the base body.

As shown in FIG. 2, the anode target plate 2000 may include the base body 2100 and the substrate 2200. The substrate 2200 and the base body 2100 may include the connection-reinforcing surfaces 2300. When the connection-reinforcing surface 2300 is arranged on the substrate 2200, the connection-reinforcing surface 2300 may be a surface of the substrate 2200 that is configured to connect the base body 2100. When the connection-reinforcing surface 2300 is arranged on the base body 2100, the connection-reinforcing surface 2300 may be a surface of the base body 2100 that is configured to connect the substrate 2200. One of the substrate 2200 and the base body 2100 may include the connection-reinforcing surface 2300. The connection-reinforcing surface 2300 may include the filler placement region 2370 and the groove region 2380. The groove region may include the plurality of grooves 2381.

In some embodiments, when the connection-reinforcing surface 2300 is arranged on the first portion 1100 (e.g., the substrate 2200), the first portion 1100 (e.g., the substrate 2200) may include a through-hole 2400. An opening of the through-hole 2400 (a first opening 2411 of a first through-hole 2410 shown in FIGS. 3-5 and a second opening 2421 of a second through-hole 2420 shown in FIGS. 7a-10) may be arranged on the connection-reinforcing surface 2300. In some embodiments, an anode rotor 4000 of the X-ray tube may pass through the through-hole 2400, so that the anode target plate 2000 may be mounted on the X-ray tube, and the anode target plate 2000 may rotate with the rotation of the anode rotor 4000. In some embodiments, the through-hole 2400 may be a structure (e.g., a mounting structure) of another type of brazing structure (e.g., a hard alloy cutter head, a drilling bit, a heat exchanger, a microwave waveguide component, an electronic vacuum device).

As illustrated in the present disclosure (e.g., FIGS. 3-6 and relevant descriptions thereof), the connection-reinforcing surface 2300 may include a first groove region 2310 and the filler placement region 2370. The filler placement region 2370 may be configured to hold the filler material 3000 in solid state. The filler material 3000 in liquid state may flow on the first groove region 2310 after the filler material 3000 is melted. The first groove region 2310 may include a plurality of first grooves 2311 to increase a brazing area and/or allow the air to exit the gap between the first portion 1100 and the second portion 1200, thereby avoiding air trapped in a braze joint formed by brazing, which in turn may improve the stability of the braze joint between the first portion 1100 (e.g., the substrate 2200) and the second portion 1200 (e.g., the base body 2100). More details about the relative position between the first groove region 2310 and the filler placement region 2370 and an arrangement manner of the plurality of first grooves 2311 of the first groove region 2310 may be found elsewhere in the present disclosure. See, e.g., FIGS. 3-6 and relevant descriptions thereof.

Figure 3:
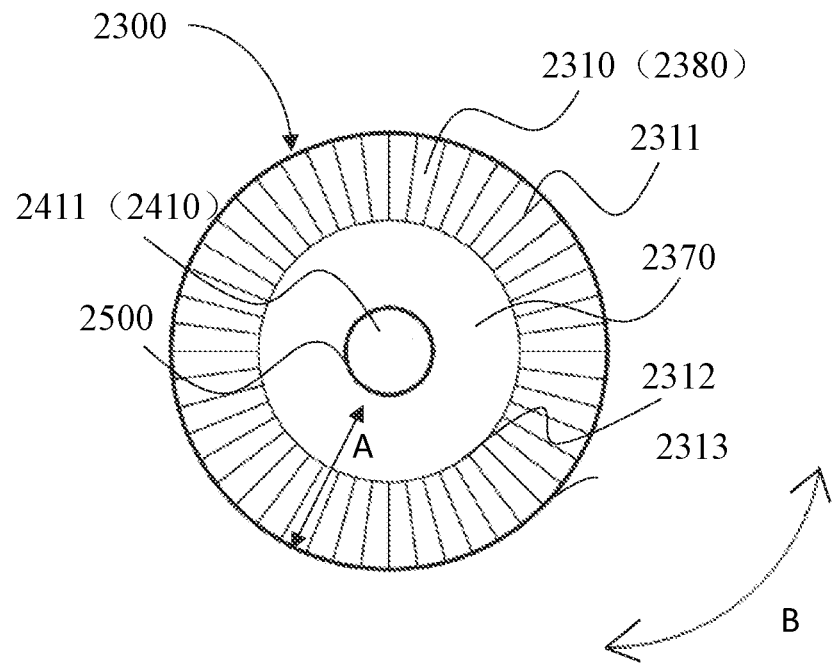
FIG. 3 is a schematic diagram illustrating an exemplary connection-reinforcing surface according to some embodiments of the present disclosure.
Figure 4:
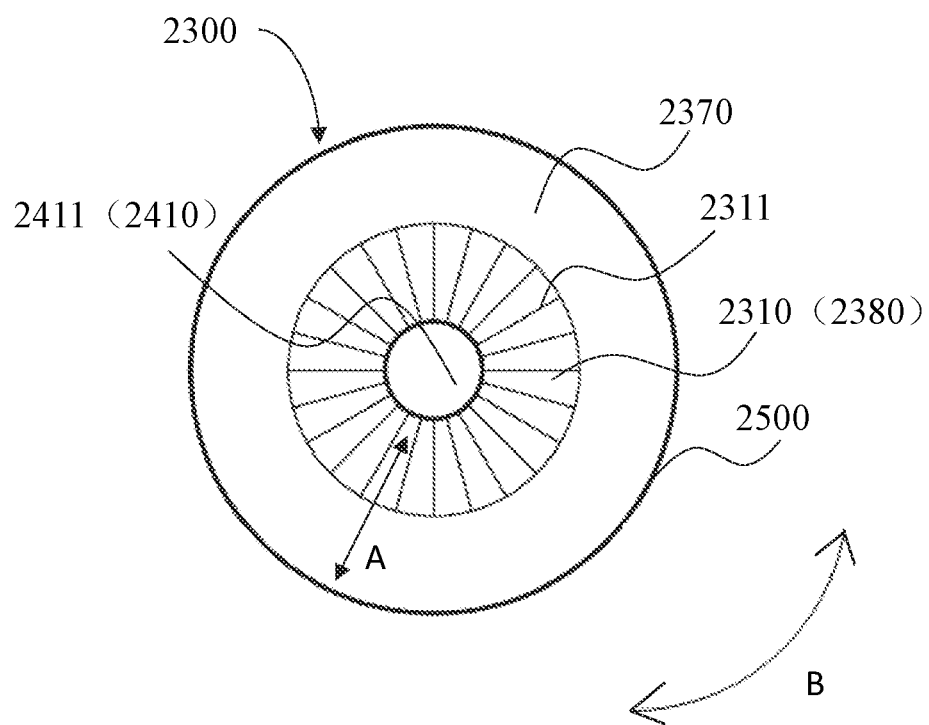
FIG. 4 is a schematic diagram illustrating an exemplary connection-reinforcing surface according to some embodiments of the present disclosure.

In some embodiments, the first groove region 2310 may surround the filler placement region 2370 (as shown in FIG. 3). In some embodiments, the filler placement region 2370 may surround the first groove region 2310 (as shown in FIG. 4). At least one end of at least one of the plurality of first grooves 2311 may be located at an edge of the first groove region 2310 that abuts the filler placement region 2370. In some embodiments, two ends of at least one of the plurality of first grooves 2311 may be located at an edge of the first groove region 2310 that abuts the filler placement region 2370. Taking the first groove region 2310 surrounding the filler placement region 2370 as an example, two ends of each of the plurality of first grooves 2311 may be located at an edge of the first groove region 2310 that abuts the filler placement region 2370. In some embodiments, a first end of at least one of the plurality of first grooves 2311 may be located at an edge of the first groove region 2310 that abuts the filler placement region 2370, and a second end of at least one of the plurality of first grooves 2311 may be located at an edge of the first groove region 2310 away from the filler placement region 2370 (as shown in FIGS. 3-6). Taking the first groove region 2310 surrounding the filler placement region 2370 as an example, a first end of each of the plurality of first grooves 2311 may be located at an inner edge of the first groove region 2310 that abuts the filler placement region 2370, and a second end of each of the plurality of first grooves 2311 may be located at an outer edge of the first groove region 2310 away from the filler placement region 2370. In some embodiments, at least one of the plurality of first grooves 2311 may extend from a position close to a center of the connection-reinforcing surface 2300 to a position away from the center of the connection-reinforcing surface 2300.

Figure 6:
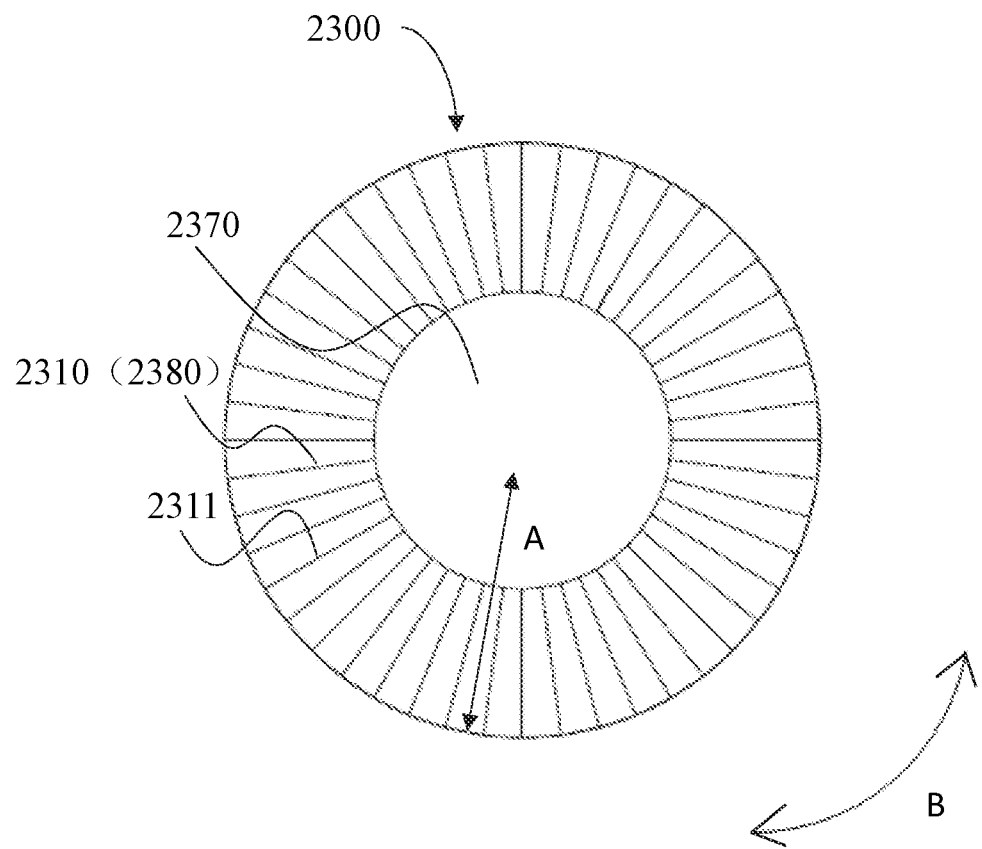
FIG. 6 is a schematic diagram illustrating an exemplary connection-reinforcing surface according to some embodiments of the present disclosure.

In some embodiments, the first groove region 2310 may surround the filler placement region 2370. The first groove region may be of an annular shape. The filler placement region 2370 may be of at least one of a plurality of shapes, such as a shape of circular, annular, rectangular, or the like, or any irregular shapes thereof. The filler placement region 2370 may be arranged at an inner edge of the first groove region 2310. More details may be found elsewhere in the present disclosure. See, e.g., FIGS. 3 and 6 and relevant descriptions thereof. FIG. 3 and FIG. 6 illustrate that the filler placement region 2370 may be of an annular shape and of a circular shape, respectively. In some embodiments, when the first groove region 2310 is of an annular shape, a shape of the inner edge of the first groove region 2310 may match a shape of the filler placement region 2370. A first end of at least one of the plurality of first grooves 2311 may be located at the outer edge of the filler placement region 2370.

In some embodiments, when the filler placement region 2370 surrounds the first groove region 2310, the filler placement region 2370 may be of an annular shape. The first groove region 2310 may be of a plurality of shapes, such as a circular shape, an annular shape, a rectangular shape, or the like, or various irregular shapes thereof. The first groove region 2310 may be arranged at the inner edge of the filler placement region 2370. More details may be found elsewhere in the present disclosure. See, e.g., FIG. 4 and relevant descriptions thereof. The first groove region 2310 of the annular shape may be shown in FIG. 4. In some embodiments, when the filler placement region 2370 is of the annular shape, the shape of the inner edge of the filler placement region 2370 may match the shape of the outer edge of the first groove region 2310. One end of the at least one of the plurality of first grooves 2311 may be located at the inner edge of the filler placement region 2370.

It should be understood that an annular shape may include a circular-ring shape, a triangular-ring shape, a rectangular-ring shape, a hexagonal-ring shape, or an irregular-ring shape. In the present disclosure, the annular shape may include an inner edge and an outer edge surrounding the inner edge. A shape of the inner edge of the annular shape may be the same as the outer edge of the annular shape. For example, the inner edge of the annular shape and the outer shape of the annular shape may be of a circular shape. That is, the annular shape may be the circular-ring shape. As another example, the inner edge of the annular shape and the outer shape of the annular shape may be of a hexagonal-ring shape. That is, the annular shape may be the hexagonal-ring shape. A shape of the inner edge of the annular shape may be different from the outer edge of the annular shape. For example, the inner edge of the annular shape may be of a circular shape, and the outer edge of the annular shape may be of a rectangular shape.

In some embodiments, when the first groove region 2310 is of an annular shape, two ends of the at least one of the plurality first grooves 2311 may be located at the inner edge and the outer edge of the first groove region 2310 (i.e., the inner edge (or referred to as the inner edge) and the outer edge (or referred to as the outer edge) of the annular shape), respectively. In some embodiments, when the first groove region 2310 is of an annular shape, under the condition that two ends of the at least one of the plurality first grooves 2311 are located at the inner edge and the outer edge of the first groove region 2310, respectively, the at least one of the plurality of first grooves 2311 may include a plurality of extending directions, so that the at least one of the plurality of first grooves 2311 may be of a plurality of shapes. In some embodiments, each of the at least one of the plurality of first grooves 2311 may be of a shape of a straight line, an arc, a curve, a zigzag line, or the like.

In some embodiments, when the first groove region 2310 is of a circular-ring shape, the at least one of the plurality of first grooves 2311 may extend along a radial direction of the first groove region 2310 (e.g., the direction indicated by arrow A in FIGS. 3-6). That is, the at least one of the plurality of first grooves 2311 may extend from an inner edge 2312 (shown in FIG. 3) of the first groove region 2310 to an outer edge 2313 (shown in FIG. 3) of the first groove region 2310. In some embodiments, when the brazing structure 1000 is the anode target plate 2000, the at least one of the plurality of first grooves 2311 may extend along a radial direction of the anode target plate 2000. In some embodiments, the radial direction of the first groove region 2310 may be the same as the radial direction of the anode target plate 2000. In some embodiments, one end of the at least one of the plurality of first grooves 2311 may be located at the outer edge of the filler placement region 2370, so that the filler material 3000 in liquid state may be applied to the end of the at least one of the plurality of first grooves 2311.

In some embodiments, the plurality of first grooves 2311 may be arranged at intervals along a circumferential direction of the brazing structure 1000. In some embodiments, the circumferential direction of the brazing structure 1000 may refer to a direction surrounding a center of the brazing structure 1000. When the brazing structure 1000 is the anode target plate 2000, the circumferential direction of the brazing structure 1000 may refer to the circumferential direction of the anode target plate 2000. In some embodiments, when a groove region 2380 of the connection-reinforcing surface 2300 of the brazing structure 1000 is of a circular-ring shape, the circumferential direction of the brazing structure 1000 may refer to the circumferential direction of the circular-ring shape. In some embodiments, the first groove region 2310 is of a circular-ring shape, the plurality of first grooves 2311 may be arranged at intervals along the circumferential direction of the first groove region 2310 (e.g., the direction indicated by arrow B in FIGS. 3-6). In some embodiments, when the brazing structure 1000 is the anode target plate 2000, the plurality of first grooves 2311 may be arranged at intervals along the circumferential direction of the anode target plate 2000. In some embodiments, the circumferential direction of the anode target plate 2000 may be the same as the circumferential direction of the first groove region 2310 that is of the circular-ring shape. In some embodiments, the plurality of first grooves 2311 may be arranged at intervals with a same dimension along the circumferential direction of the brazing structure 1000 (e.g., the direction indicated by arrow B in FIGS. 3-6). That is, the intervals between at least a pair of adjacent first grooves 2311 of the plurality of first grooves 2311 may be of a same dimension.

In some embodiments, to prevent the loss of the filler material 3000 in liquid state from an edge of the connection-reinforcing surface 2300 (e.g., a first opening 2411 or the outer edge of the connection-reinforcing surface 2300 shown in FIGS. 2-5), the connection-reinforcing surface 2300 may include a blocking component. In some embodiments, as shown in FIG. 3 or FIG. 4, the blocking component may be a bulging rim 2500 of the connection-reinforcing surface 2300. The bulging rim 2500 may be arranged at an edge of the first opening 2411 (shown in FIG. 3) and/or the outer edge of the connection-reinforcing surface 2300 (shown in FIG. 4). In some embodiments, the blocking component may be a baffle detachably connected to the connection-reinforcing surface 2300, and the baffle may be arranged at the edge of the first opening 2411 and/or the outer edge of the connection-reinforcing surface 2300. The baffle may be removed after a brazing operation is finished. The blocking component may prevent the loss of the filler material 3000 in liquid state from the first opening 2411 or the outer edge of the connection-reinforcing surface 2300, so that the filler material 3000 is retained to form the braze joint connecting the first portion 1100 (e.g., the substrate 2200) to the second portion 1200 (e.g., the base body 2100).

FIG. 3 is a schematic diagram illustrating an exemplary connection-reinforcing surface 2300 according to some embodiments of the present disclosure.

As shown in FIG. 3, when the connection-reinforcing surface 2300 includes the first opening 2411, the filler placement region 2370 may be of an annular shape that surrounds the first opening 2411. The first groove region 2310 may surround the filler placement region 2370. A first end of the at least one of the plurality of first grooves 2311 (e.g., each of the plurality of first grooves 2311) may be located at the outer edge of the filler placement region 2370, and a second end of the at least one of the plurality of first grooves 2311 may be located at the outer edge of the connection-reinforcing surface 2300. After the filler material 3000 in solid state that is held on the filler placement region 2370 is melted, the melted filler material 3000 may flow into the plurality of first grooves 2311 from the outer edge of the filler placement region 2370 via the first end of the at least one of the plurality of first grooves 2311. During the filler material 3000 in liquid state flowing along the at least one of the plurality of first grooves 2311, the air in the at least one of the plurality of first grooves 2311 may be pushed out from the outer edge of the connection-reinforcing surface 2300 through the second end of the at least one of the plurality of first grooves 2311.

FIG. 4 is a schematic diagram illustrating an exemplary connection-reinforcing surface according to some embodiments of the present disclosure. As shown in FIG. 4, when the connection-reinforcing surface 2300 includes the first opening 2411, the filler placement region 2370 may be of an annular shape. The first groove region 2310 may surround the first opening 2411, and the filler placement region 2370 may surround the first groove region 2310. The first end of the at least one of the plurality of first grooves 2311 (e.g., each of the plurality of first grooves 2311) may be located at the edge of the first opening 2411, and the second end of the at least one of the plurality of first grooves 2311 may be located at the inner edge of the filler placement region 2370. After the filler material 3000 in solid state that is held on the filler placement region 2370 is melted, the melted filler material 3000 may flow into the plurality of first grooves 2311 from the inner edge of the filler placement region 2370 via the second end of the at least one of the plurality of first grooves 2311. During the filler material 3000 in liquid state flowing along the at least one of the plurality of first grooves 2311, the air in the at least one of the plurality of first grooves 2311 may be pushed out from the edge of the first opening 2411 through the first end of the at least one of the plurality of first grooves 2311.

In some embodiments, to prevent the loss of the filler material 3000 in liquid state from the edge of the filler placement region 2370 away from the first groove region 2310, the blocking component may be arranged along the edge of the filler placement region 2370 away from the first groove region 2310. For example, as shown in FIG. 3, when the first groove region 2310 surrounds the filler placement region 2370, the blocking component (e.g., the bulging rim 2500) may be arranged along the edge of the first opening 2411. As another example, as shown in FIG. 4, when the filler placement region 2370 surrounds the first groove region 2310, the blocking component (e.g., the bulging rim 2500) may be arranged along the outer edge of the connection-reinforcing surface 2300.

Figure 5:
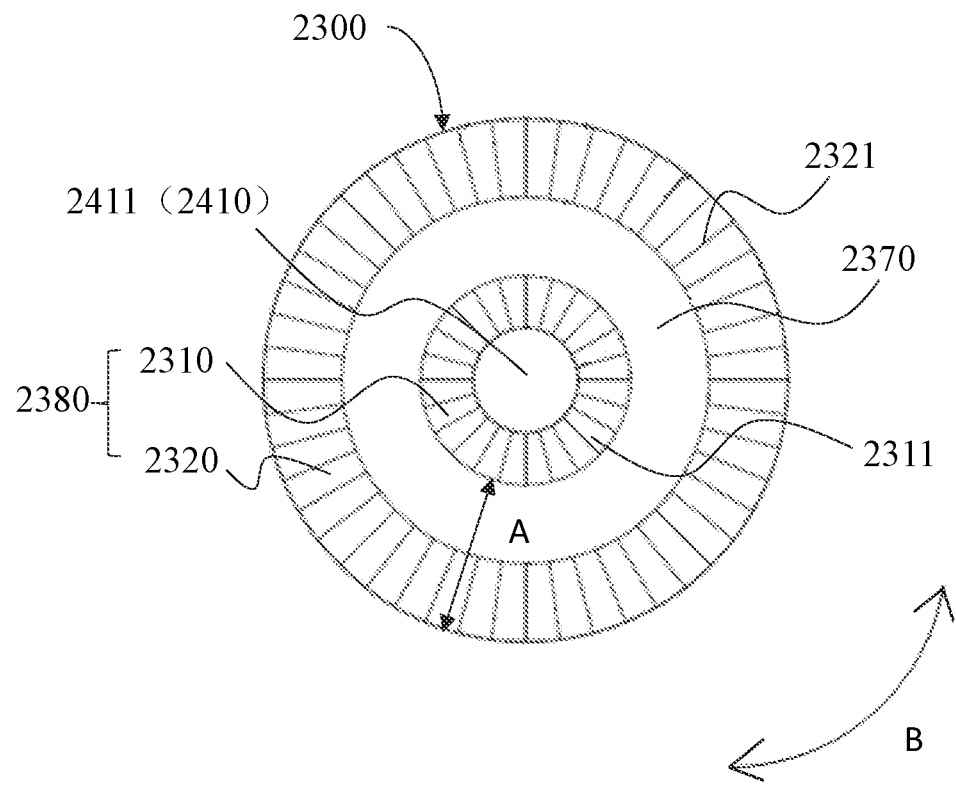
FIG. 5 is a schematic diagram illustrating an exemplary connection-reinforcing surface according to some embodiments of the present disclosure.

FIG. 5 is a schematic diagram illustrating an exemplary connection-reinforcing surface according to some embodiments of the present disclosure. As shown in FIG. 5, when the connection-reinforcing surface 2300 includes the first opening 2411, the connection-reinforcing surface 2300 may include a second groove region 2320. The second groove region 2320 may be of an annular shape that includes a plurality of second grooves 2321. Two ends of at least one of the plurality of second grooves 2321 (e.g., each of the plurality of second grooves 2321) may be located at an inner edge and an outer edge of the second groove region 2320, respectively. The first groove region 2310 may surround a first through-hole 2410, the filler placement region 2370 may surround the first groove region 2310, and the second groove region 2320 may surround the filler placement region 2370.

The first end of each of the plurality of first grooves 2311 may be located at the edge of the first opening 2411, and the second end of each of the plurality of first grooves 2311 may be located at the inner edge of the filler placement region 2370. A first end of each of the plurality of second grooves 2321 may be located at the outer edge of the filler placement region 2370, and a second end of each of the plurality of second grooves 2321 may be located at the outer edge of the connection-reinforcing surface 2300. After the filler material 3000 in solid state that is held on the filler placement region 2370 is melted, the filler material 3000 in liquid state may flow into the plurality of first grooves 2311 from the inner edge of the filler placement region 2370 via the second end of the at least one of the plurality of first grooves 2311, and the filler material 3000 in liquid state may also flow into the plurality of second grooves 2321 from the outer edge of the filler placement region 2370 via the first end of the at least one of the plurality of second grooves 2321. During the filler material 3000 in liquid state flowing along the at least one of the plurality of first grooves 2311 and the at least one of the plurality of second grooves 2321, the air in the at least one of the plurality of first grooves 2311 may be pushed out from the edge of the first opening 2411 through the first end of the at least one of the plurality of first grooves 2311, and the air in the at least one of the plurality of second grooves 2321 may be pushed out from the outer edge of the connection-reinforcing surface 2300 through the second end of the at least one of the plurality of second grooves 2321.

It should be understood that a shape and a size of a cross-section of the at least one of the plurality of second grooves 2321 may be similar to a shape and a size of a cross-section of the at least one of the plurality of first grooves 2311. More details about the shape and the size of the cross-section of the at least one of the plurality of second grooves 2321 may be found elsewhere in the present disclosure. See, e.g., FIG. 11 and relevant descriptions of the shape and the size of the groove 2381. The first groove region 2310 and the second groove region 2320 may improve the flowing of the filler material 3000 in liquid state, which effectively increases an area of a region that includes the grooves (including the plurality of first grooves 2311 and the plurality of second grooves 2321), and uniformly applies the filler material 3000 in liquid state to the connection-reinforcing surface 2300, thereby effectively improving the connection strength of the braze joint that connects the first portion 1100 (e.g., the substrate 2200) to the second portion 1200 (e.g., the base body 2100).

In some embodiments, the second groove region 2320 may be of a circular-ring shape. That is, an inner edge and an outer edge of the second groove region 2320 may be of a circular shape. In some embodiments, the second groove region 2320 may also be of a rectangular-ring shape, a hexagonal-ring shape, or the like.

In some embodiments, the at least one of the plurality of second grooves 2321 may be of a shape of a straight line, an arc, a curve, or a zigzag line. In some embodiments, when the second groove region 2320 is of a circular-ring shape, the at least one of the plurality of second grooves 2321 may extend along a radial direction of the second groove region 2320 (e.g., the direction indicated by arrow A in FIG. 5). In some embodiments, when the brazing structure 1000 is the anode target plate 2000, the at least one of the plurality of second grooves 2321 may extend along a radial direction of the anode target plate 2000. In some embodiments, the radial direction of the second groove region 2320 may be the same as the radial direction of the anode target plate 2000.

In some embodiments, the plurality of second grooves 2321 may be arranged at intervals along the circumferential direction (e.g., the direction indicated by arrow B in FIG. 5) of the brazing structure 1000. That is, the plurality of second grooves 2321 may be spaced apart along the circumferential direction of the brazing structure 1000. In some embodiments, when the second groove region 2320 is of an annular shape, the plurality of second grooves 2321 may be arranged at intervals along the circumferential direction of the second groove region 2320. In some embodiments, when the brazing structure 1000 is the anode target plate 2000, the plurality of second grooves 2321 may be arranged at intervals along the circumferential direction of the anode target plate 2000. In some embodiments, the circumferential direction of the anode target plate 2000 may be the same as the circumferential direction of the second groove region 2320 that is of the circular-ring shape. In some embodiments, the plurality of second grooves 2321 may be arranged at intervals with a same dimension along the circumferential direction of the second groove region 2320 (e.g., the direction indicated by arrow B in FIG. 5). That is, the interval between at least a pair of adjacent second grooves 2321 of the plurality of second grooves 2321 may be of a same dimension.

In some embodiments, a center of the second groove region 2320 that is of the circular-ring shape may (substantially or completely) coincide with a center of the connection-reinforcing surface 2300. In some embodiments, the center of the second groove region 2320 that is of the circular-ring shape may (substantially or completely) coincide with a center of the first opening 2411. In some embodiments, the center of the second groove region 2320 that is of the circular-ring shape may (substantially or completely) coincide with a center of the first groove region 2310. In some embodiments, the center of the second groove region 2320 that is of the circular-ring shape may (substantially or completely) coincide with a center of the filler placement region 2370.

In some embodiments, an area of the groove region 2380 may be greater than or equal to 40% of an area of the connection-reinforcing surface 2300. That is, when the connection-reinforcing surface 2300 only includes the first groove region 2310, an area of the first groove region 2310 may be greater than or equal to 40% of the area of the connection-reinforcing surface 2300. When the connection-reinforcing surface 2300 includes the first groove region 2310 and the second groove region 2320, a sum of an area of the first groove region 2310 and an area of the second groove region 2320 may be greater than or equal to 40% of the area of the connection-reinforcing surface 2300. The groove region may increase the brazing area, generate the capillary effect to facilitate the filler material 3000 in liquid state to flow from the filler placement region 2370 to a region including the grooves (e.g., the first groove region 2310 and/or the second groove region 2320), and allow the air to exit the gap between the first portion 1100 and the second portion 1200, which may effectively increase the connection stability of the braze joint that connects the first portion 1100 (e.g., the substrate 2200) to the second portion 1200 (e.g., the base body 2100). The grooves, e.g., the first grooves 2311, the second grooves 2321, etc., may constitute part of the gap between the first portion 1100 and the second portion 1200.

In some embodiments, a length of the at least one of the plurality of first grooves 2311 may be (substantially) the same as a length of the at least one of the plurality of second grooves 2321, so that a length of a flowing route of the filler material 3000 in liquid state may be (substantially) the same. The filler material 3000 may be uniformly applied to the connection-reinforcing surface 2300.

FIG. 6 is a schematic diagram illustrating an exemplary connection-reinforcing surface according to some embodiments of the present disclosure. As shown in FIG. 6, the filler placement region 2370 may be of a circular shape, and the first groove region 2310 may surround the filler placement region 2370. The inner edge of the first groove region 2310 may be of a circular shape to match the outer edge of the filler placement region 2370. The first end of each of the plurality of first grooves 2311 may be located at the outer edge of the filler placement region 2370, and the second end of the each of the plurality of first grooves 2311 may be located at the outer edge of the connection-reinforcing surface 2300. After the filler material 3000 in solid state that is held on the filler placement region 2370 is melted, the filler material 3000 in liquid state may flow into the plurality of first grooves 2311 from the outer edge of the filler placement region 2370 via the second end of the at least one of the plurality of first grooves 2311. During the filler material 3000 in liquid state flowing along the at least one of the plurality of first grooves 2311, the air in the at least one of the plurality of first grooves 2311 may be pushed out from the outer edge of the connection-reinforcing surface 2300 through the first end of the at least one of the plurality of first grooves 2311.

In some embodiments, the center of the filler placement region 2370 that is of the circular-ring shape may (substantially or completely) coincide with the center of the connection-reinforcing surface 2300. In some embodiments, the center of the filler placement region 2370 that is of the circular-ring shape may (substantially or completely) coincide with the center of the first groove region 2310.

In some embodiments, the connection-reinforcing surface 2300 may be of the circular shape, and the first groove region 2310 may be of the circular-ring shape. The center of the first groove region 2310 may (substantially or completely) coincide with the center of the connection-reinforcing surface 2300. Each of the plurality of first grooves 2311 may extend along the radial direction (the same as the radial direction of the anode target plate 2000) of the first groove region 2310 that is of the circular-ring shape. In addition, the plurality of first grooves 2311 may be arranged at intervals along the circumferential direction of the first groove region 2310 (e.g., the direction indicated by arrow B in FIGS. 3-6). In some embodiments, when the filler placement region 2370 is of the circular shape or the circular-ring shape, the center of the filler placement region 2370, the center of the connection-reinforcing surface 2300, and the center of the first groove region 2310 may (substantially or completely) coincide with each other.

In some embodiments, as shown in FIGS. 3-6, a width of each of the plurality of first grooves 2311 may be set to cause the at least a pair of adjacent first grooves 2311 of the plurality of first grooves 2311 being of the same dimension along the circumferential direction of the anode target plate 2000 (e.g., the direction indicated by arrow B in FIGS. 3-6). It should be understood that the width of the each of the plurality of first grooves 2311 may be increased gradually from the inside of the first groove region 2310 to the outside of the first groove region 2310 along the radial direction of the first groove region 2310 (e.g., the direction indicated by arrow A in FIGS. 3-6), so that the at least a pair of adjacent first grooves 2311 of the plurality of first grooves 2311 may be of the same dimension along the circumferential direction of the anode target plate 2000. In some embodiments, a width of each of the plurality of second grooves 2321 may be set to cause the at least a pair of adjacent second grooves 2321 of the plurality of second grooves 2321 being of the same dimension along the circumferential direction of the anode target plate 2000. It should be understood that the width of the each of the plurality of second grooves 2321 may be increased gradually from the inside of the second groove region 2320 to the outside of the second groove region 2320 along the radial direction of the second groove region 2320 (e.g., the direction indicated by arrow A in FIGS. 3-6), so that the at least a pair of adjacent second grooves 2321 of the plurality of second grooves 2321 may be of the same dimension along the circumferential direction of the anode target plate 2000. The plurality of first grooves 2311 and/or the plurality of second grooves 2321 may be distributed uniformly on the connection-reinforcing surface 2300 through the arrangement mentioned above, so that the filler material 3000 may be uniformly applied to the connection-reinforcing surface 2300.

As illustrated in the present disclosure (e.g., FIGS. 7a-10 and relevant descriptions thereof), the connection-reinforcing surface 2300 may include a third groove region 2330 and a filler placement region 2370. The filler placement region 2370 may be configured to hold the filler material 3000 in solid state. The filler material 3000 in liquid state may be applied to the third groove region 2330. The third groove region 2330 may include a plurality of third grooves 2331 to increase the brazing area and facilitate pushing out the air, thereby improving the stability of the braze joint that connects the first portion 1100 (e.g., the substrate 2200) to the second portion 1200 (e.g., the base body 2100). More details about a relative position between the third groove region 2330 and the filler placement regions 2370 and an arrangement manner of the plurality of third grooves 2331 on the third groove region 2330 may be found elsewhere in the present disclosure. See, e.g., FIGS. 7a-10 and relevant descriptions thereof. In addition, it should be noted that FIGS. 7a-10 show a third groove region 2330 including a plurality of third groove sub-regions 2335 (four third groove sub-regions 2335 shown in FIGS. 7a-10) and a filler placement region 2370 including a plurality of filler placement sub-regions 2375 (four filler placement sub-regions 2375 shown in FIGS. 7a-10). In some embodiments, a count of the plurality of third groove sub-regions 2335 and a count of the plurality of filler placement sub-regions 2375 may be other numbers, such as three, five, eight, or the like.

In some embodiments, the plurality of filler placement sub-regions 2375 may be arranged at intervals, and at least one of the plurality of third groove sub-regions 2335 may be arranged between a pair of adjacent filler placement sub-regions 2375 of the plurality of filler placement sub-regions 2375. Each of the plurality of third groove sub-regions 2335 may include a plurality of third grooves 2331. In some embodiments, two ends of at least one of the plurality of third grooves 2331 on the each of the plurality of third groove sub-regions 2335 may be located at two sides of the each of the plurality of third groove sub-regions 2335 and in communication with two filler placement sub-regions 2375 that abut the each of the plurality of third groove sub-regions 2335. In some embodiments, one end of the at least one of the plurality of third grooves 2331 on the each of the plurality of third groove sub-regions 2335 may be located at one side of the each of the plurality of third groove sub-regions 2335 and in communication with a filler placement region 2370 that abuts the each of the plurality of third groove sub-regions 2335. That is, at least one end of the at least one of the plurality of third grooves 2331 may be located at a side edge of the each of the plurality of third groove sub-regions 2335 and in communication with at least one of the plurality of filler placement sub-regions 2375 that abuts the each of the plurality of third groove sub-regions 2335, so that after the filler material 3000 in solid state is melted, the filler material 3000 in liquid state may flow into the third groove region 2330 (e.g., the filler material 3000 in liquid state may flow into a third groove sub-region 2335 from a filler placement sub-region 2375 that is adjacent to the third groove sub-region 2335) from the filler placement region 2370 through the plurality of third grooves 2331 to form the braze joint that connects the first portion 1100 (e.g., the substrate 2200) to the second portion (e.g., the base body 2100).

In some embodiments, the plurality of filler placement sub-regions 2375 may be arranged at intervals along the circumferential direction (e.g., the direction indicated by arrow D in FIGS. 7a-10) of the brazing structure 1000 (e.g., the anode target plate 2000). That is, a pair of adjacent filler placement sub-regions 2375 may be spaced apart along the circumferential direction of the brazing structure 1000 (e.g., the anode target plate 2000). At least one of the plurality of third groove sub-regions 2335 may be arranged between the pair of adjacent filler placement sub-regions 2375.

In some embodiments, the plurality of filler placement sub-regions 2375 may be arranged at intervals. The intervals may be of a substantially same dimension. That is, an angle between central axes (the dashed line e and the dotted line f shown in FIG. 7a and FIG. 7b) of a pair of adjacent filler placement sub-regions 2375 of the plurality of filler placement sub-regions 2375 may be substantially equal. For example, when the filler placement region 2370 includes three filler placement sub-regions 2375, the angle between the central axes of any pair of adjacent filler placement sub-regions 2375 of the plurality of filler placement sub-regions 2375 may be 120°. As another example, when the filler placement region 2370 includes four filler placement sub-regions 2375, the angle between the central axes of any pair of adjacent filler placement sub-regions 2375 of the plurality of filler placement sub-regions 2375 may be 90°.

In some embodiments, the third groove region 2330 (e.g., the plurality of third groove sub-regions 2335) and the filler placement region 2370 (e.g., the plurality of filler placement sub-regions 2375) may form an annular region. A center of the annular region may coincide with the center of the connection-reinforcing surface 2300. An inner edge of each of the plurality of third groove sub-regions 2335 and an inner edge of each of the plurality of filler placement sub-regions 2375 may be located on an inner edge of the annular region. An outer edge of each of the plurality of third groove sub-regions 2335 and an outer edge of each of the plurality of filler placement sub-regions 2375 may be located on an outer edge of the annular region.

It should be understood that an annular shape of the annular region may include a circular-ring shape, a triangular-ring shape, a rectangular-ring shape, a hexagonal-ring shape, an irregular-ring shape, or the like. In the present disclosure, the annular shape may include an inner edge and an outer edge surrounding the inner edge. A shape of the inner edge of the annular shape may be the same as the outer edge of the annular shape. For example, the inner edge of the annular shape and the outer shape of the annular shape may be of a circular shape. That is, the annular shape may be the circular-ring shape. As another example, the inner edge of the annular shape and the outer shape of the annular shape may be of a hexagonal-ring shape. That is, the annular shape may be the hexagonal-ring shape. A shape of the inner edge of the annular shape may be different from the outer edge of the annular shape. For example, the inner edge of the annular shape may be of a circular shape, and the outer edge of the annular shape may be of a rectangular shape.

In some embodiments, the at least one of the plurality of third grooves 2331 may be of a shape of a straight line, an arc, a curve, a zigzag line, or the like.

In some embodiments, the at least one of the plurality of third grooves 2331 may extend along the circumferential direction of the brazing structure 1000. In some embodiments, when the annular region is of a circular-ring shape, the at least one of the plurality of third grooves 2331 may extend along a circumferential direction of the annular region. In some embodiments, when the brazing structure 1000 is the anode target plate 2000, the at least one of the plurality of third grooves 2331 may extend along the circumferential direction of the anode target plate 2000 (e.g., the direction indicated by arrow D in FIGS. 7a-10). In some embodiments, the circumferential direction of the anode target plate 2000 may be the same as the circumferential direction of the annular region.

In some embodiments, for each of the plurality of third groove sub-regions 2335, the plurality of third grooves 2331 may be arranged at intervals from the inside of the annular region to the outside of the annular region. When the annular region is of a circular-ring shape, for each of the plurality of third groove sub-regions 2335, the plurality of third grooves 2331 may be arranged at intervals along a radial direction of the annular region. When the brazing structure 1000 is the anode target plate 2000, for each of the plurality of third groove sub-regions 2335, the plurality of third grooves 2331 may be arranged at intervals along the radial direction of the anode target plate 2000 (e.g., the direction indicated by arrow C in FIGS. 7a-10). That is, a pair of adjacent third grooves 2331 of the plurality of third grooves 2331 on the each of the plurality of third groove sub-regions 2335 may be spaced apart along the radial direction of the annular region or the radial direction of the anode target plate 2000. In some embodiments, the radial direction of the anode target plate 2000 may be the same as the radial direction of the annular region.

In some embodiments, the connection-reinforcing surface 2300 may be of a circular shape, and each of the plurality of filler placement sub-regions 2375 may be of a sector-ring shape. A center of the each of the plurality of filler placement sub-regions 2375 that is of the sector-ring shape may coincide with the center of the connection-reinforcing surface 2300. In some embodiments, each of the plurality of third groove sub-regions 2335 may be of a sector-ring shape. The annular region that is formed by the third groove region 2330 and the filler placement region 2370 may be of a circular-ring shape. In some embodiments, the connection-reinforcing surface 2300 may be of other shapes. For example, the connection-reinforcing surface 2300 may be of a rectangular shape, and the each of the plurality of filler placement sub-regions 2375 may also be of a rectangular shape. In some embodiments, the each of the plurality of third groove sub-regions 2335 may be of a rectangular shape. The annular region that is formed by the third groove region 2330 and the filler placement region 2370 may be of a rectangular-ring shape (i.e., an annular shape whose inner edge and outer edge may be of the rectangular shape).

In some embodiments, to prevent the loss of the filler material 3000 in liquid state from an edge of the connection-reinforcing surface 2300 (e.g., a second opening 2421 or the outer edge of the connection-reinforcing surface 2300), the connection-reinforcing surface 2300 may include the blocking component. The blocking component may be arranged at an edge of the second opening 2421 and/or the outer edge of the connection-reinforcing surface 2300. In some embodiments, as shown in FIGS. 7a-9, the blocking component may be the bulging rim 2500 that is fixed the connection-reinforcing surface 2300. The bulging rim 2500 may be arranged at the edge of the second opening 2421 (shown in FIG. 7a, FIG. 7b, or FIG. 8) and/or the outer edge of the connection-reinforcing surface 2300 (shown in FIG. 9). In some embodiments, the blocking component may be a baffle detachably connected to the connection-reinforcing surface 2300, and the baffle may be arranged at the edge of the second opening 2421 and/or the outer edge of the connection-reinforcing surface 2300. The baffle may be removed after the brazing operation is finished. The blocking component may prevent the loss of the filler material 3000 in liquid state from the second opening 2421 or the outer edge of the connection-reinforcing surface 2300, which ensures enough filler material 3000 to be used to form the braze joint connecting the substrate 2200 to the base body 2100.

Figure 7A:
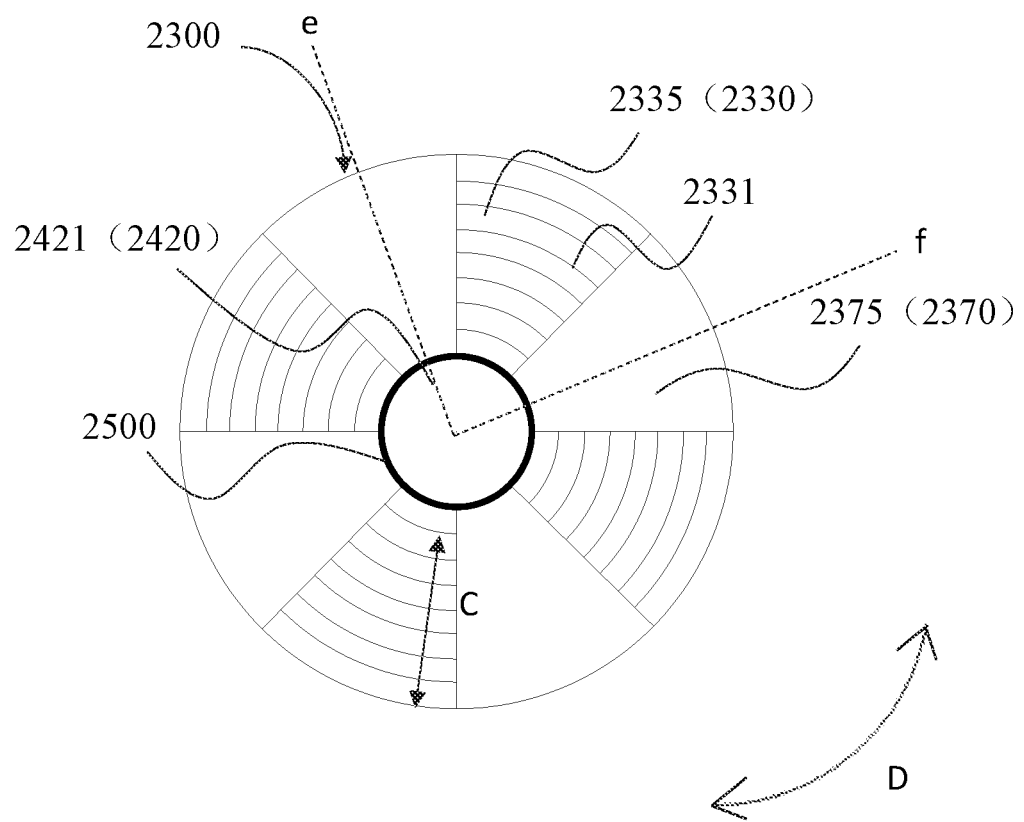
FIG. 7a is a schematic diagram illustrating an exemplary connection-reinforcing surface according to some embodiments of the present disclosure.
Figure 7B:
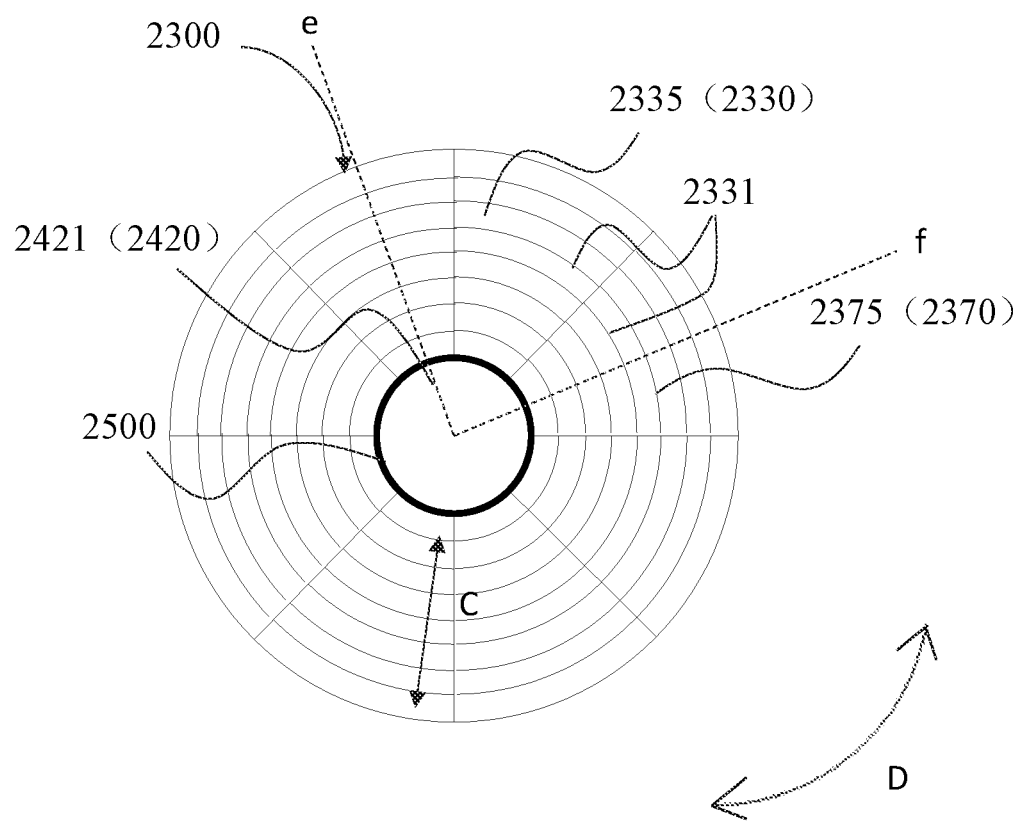
FIG. 7b is a schematic diagram illustrating an exemplary connection-reinforcing surface according to some embodiments of the present disclosure.

In some embodiments, as shown in FIG. 7b, at least a portion of the filler placement region 2370 (e.g., the plurality of filler placement sub-regions 2375) may include a plurality of third grooves 2331. In some embodiments, an arrangement manner of the plurality of third grooves on the at least one of the plurality of filler placement sub-regions 2375 may be similar to an arrangement manner of the plurality of third grooves on the at least one of the plurality of third groove sub-regions 2335. In some embodiments, two ends of each of the plurality of third grooves 2331 on the at least one of the plurality of filler placement sub-regions 2375 may be connected to one end of the at least one of the plurality third grooves 2331 on a pair of adjacent third groove sub-regions 2335 of the plurality of third groove sub-regions 2335, respectively. In some embodiments, the plurality of third grooves 2331 as a whole may be of a circular-ring shape extending along the circumferential direction of the anode target plate 2000. That is, the plurality of third grooves 2331 on the at least one of the plurality of third groove sub-regions 2335 and the plurality of third grooves 2331 on the at least one of the plurality of filler placement sub-regions 2375 may be continuous. The at least one of the plurality of filler placement sub-regions 2375 may include the plurality of third grooves 2331, and the plurality of third grooves 2331 on the at least one of the plurality of third groove sub-regions 2335 and the plurality of third grooves 2331 on the at least one of the plurality of filler placement sub-regions 2375 may be continuous, thereby facilitating the processing of the plurality of third grooves 2331 on the connection-reinforcing surface 2300 and improving the processing efficiency of the connection-reinforcing surface 2300.

In some embodiments, the at least one of the plurality of filler placement sub-regions 2375 may be a smooth surface. In some embodiments, a surface roughness Ra of the at least one of the plurality of filler placement sub-regions 2375 may be less than or equal to 6.3. In some embodiments, a surface roughness Ra of the at least one of the plurality of filler placement sub-regions 2375 may be less than or equal to 3.2. In some embodiments, a surface roughness standard may be achieved by setting a processing manner. The at least one of the plurality of filler placement sub-regions 2375 may be smoother by setting the surface roughness of the at least one of the plurality of filler placement sub-regions 2375 as Ra, so that the at least one of the plurality of filler placement sub-regions 2375 may fit a surface of a filler material sheet to avoid the formation of air bubbles between the at least one of the plurality of filler placement sub-regions 2375 and the surface of the filler material sheet due to the presence of a plurality of pores during the brazing process.

FIG. 7a is a schematic diagram illustrating an exemplary connection-reinforcing surface according to some embodiments of the present disclosure. The connection-reinforcing surface 2300 may include a third groove region 2330 and a filler placement region 2370. As shown in FIG. 7a, the third groove region 2330 may include a plurality of third groove sub-regions 2335, and the filler placement region 2370 may include a plurality of filler placement sub-regions 2375. The plurality of third groove sub-regions 2335 and the plurality of filler placement sub-regions 2375 may be arranged at intervals along the circumferential direction (e.g., the direction indicated by arrow D in FIG. 7a) of the brazing structure 1000 (e.g., the anode target plate 2000). As shown in FIG. 7a, the annular region that is formed by the plurality of third groove sub-regions 2335 and the plurality of filler placement sub-regions 2375 may surround the second opening 2421. A third groove sub-region 2335 may be arranged between a pair of adjacent filler placement sub-regions 2375 of the plurality of filler placement sub-regions 2375. At least one end of the at least one of the plurality of third grooves 2331 of a third groove sub-region 2335 may contact a side edge of and be in fluid communication with one of the plurality of filler placement sub-regions 2375 that abuts the at least one of the plurality of third groove sub-regions 2335.

FIG. 7b is a schematic diagram illustrating an exemplary connection-reinforcing surface according to some embodiments of the present disclosure. The connection-reinforcing surface 2300 illustrated in FIG. 7b is similar to the connection-reinforcing surface 2300 illustrated in FIG. 7a except that at least a portion of the filler placement region 2370 as illustrated in FIG. 7b may include a plurality of third grooves 2331, while the filler placement region 2370 as illustrated in FIG. 7a includes no third groove 2331.

Additional details about the shape and the size of the at least one of the plurality of third grooves 2331 may be found in relevant descriptions about the plurality of grooves 2381, which are not repeated here.

Figure 8:
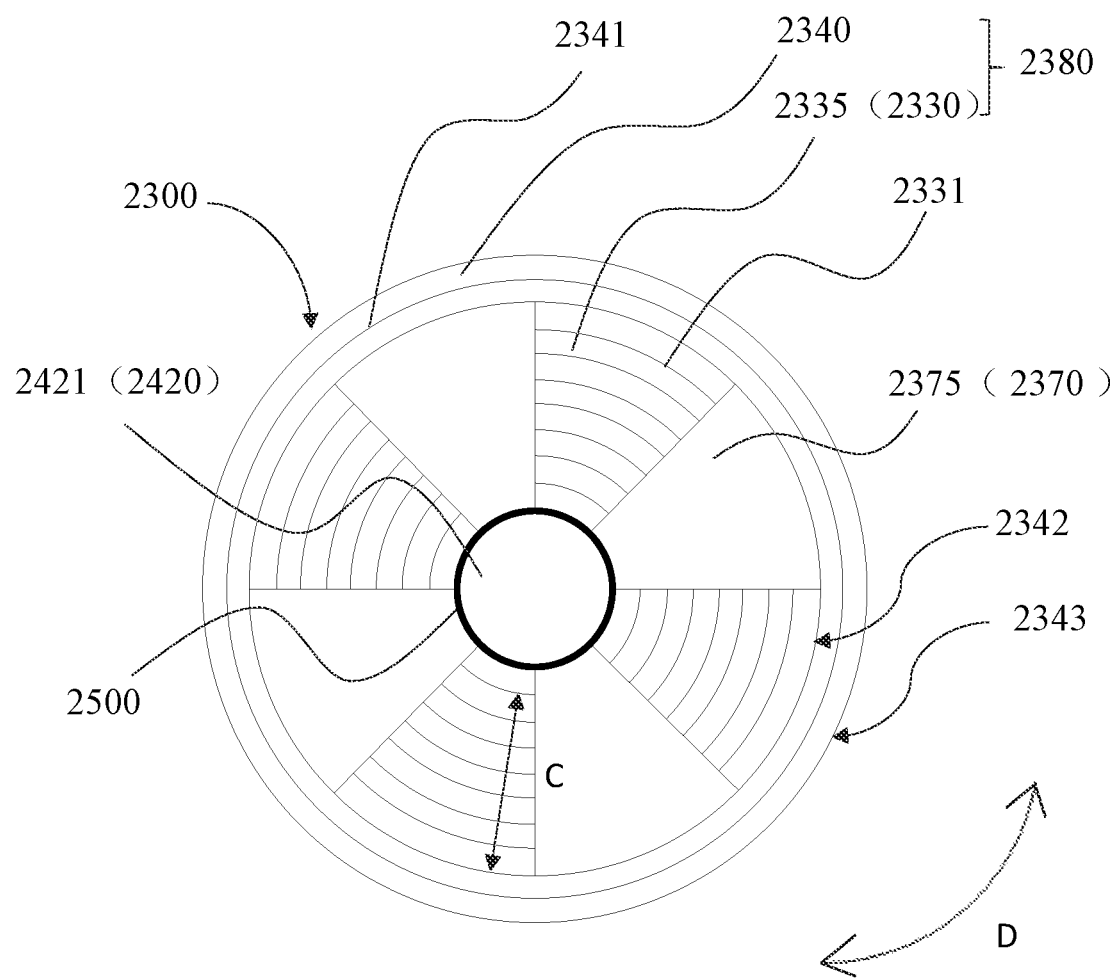
FIG. 8 is a schematic diagram illustrating an exemplary connection-reinforcing surface according to some embodiments of the present disclosure.

FIG. 8 is a schematic diagram illustrating an exemplary connection-reinforcing surface according to some embodiments of the present disclosure. The connection-reinforcing surface 2300 as illustrated in FIG. 8 is similar to the connection-reinforcing surface 2300 as illustrated in FIG. 7a except that in addition to the structural components of the connection-reinforcing surface 2300 as illustrated in FIG. 7a, the connection-reinforcing surface 2300 as illustrated in FIG. 8 may include a fourth groove region 2340. The fourth groove region 2340 may be of an annular shape defined by an inner edge 2342 and an outer edge 2343. The fourth groove region 2340 may include a plurality of fourth grooves 2341. At least one of the plurality of fourth grooves 2341 may be of an annular shape. The annular region that is formed by the plurality of third groove sub-regions 2335 and the plurality of filler placement sub-regions 2375 may surround the second opening 2421. The fourth groove region 2340 may surround the annular region. The filler material 3000 in liquid state may flow from an edge of the filler placement region 2370 that is located at an outer edge 2343 of the annular region into the fourth groove regions 2340. The filler material 3000 in liquid state may flow along the plurality of fourth grooves 2341.

In some embodiments, the inner edge 2342 of the fourth groove region 2340 and the outer edge 2343 of the annular region where the filler placement region 2370 is located may be of similar shapes. For example, when the outer edge 2343 of the annular region is of a circular shape, the outer edge 2343 of the annular region and the inner edge 2342 of the fourth groove region 2340 may be concentric circles. As another example, when the outer edge 2343 of the annular region is of a rectangular shape, the inner edge 2342 of the fourth groove region 2340 may be of a similar rectangular shape.

In some embodiments, the at least one of the plurality of fourth grooves 2341 may be of a shape of a curve or a zigzag.

The at least one of the plurality of fourth grooves 2341 may be of an annular shape, such as a circular-ring shape, a rectangular-ring shape, or an irregular-ring shape. In some embodiments, the at least one of the plurality of fourth grooves 2341 may extend along the circumferential direction of the brazing structure 1000. In some embodiments, when the fourth groove region 2340 is of a circular-ring shape, the at least one of the plurality of fourth grooves 2341 may extend along the circumferential direction of the fourth groove region 2340. In some embodiments, when the brazing structure 1000 is the anode target plate 2000, the at least one of the plurality of fourth grooves 2341 may extend along the circumferential direction of the anode target plate 2000. In some embodiments, the circumferential direction of the anode target plate 2000 may be the same as the circumferential direction of the fourth groove region 2340.

In some embodiments, the plurality of fourth grooves 2341 may be arranged at intervals from an inner edge 2342 of the fourth groove region 2340 to an outer edge 2343 of the fourth groove region 2340. In some embodiments, when the fourth groove region 2340 is of a circular-ring shape, the plurality of fourth grooves 2341 may be arranged at intervals along a radial direction (e.g., the direction indicated by arrow C in FIG. 8) of the fourth groove region 2340. In some embodiments, when the brazing structure 1000 is the anode target plate 2000, the plurality of fourth grooves 2341 may be arranged at intervals along the radial direction of the anode target plate 2000. In some embodiments, the radial direction of the anode target plate 2000 may be the same as the radial direction of the fourth groove region 2340.

The arrangement of the plurality of fourth grooves 2341 surrounding the inner edge 2342 of the fourth groove region 2340 may effectively prevent the filler material 3000 in liquid state from overflowing from the outer edge of the connection-reinforcing surface 2300 when the filler material 3000 in liquid state flows from the inner edge 2342 of the fourth groove region 2340 to the outer edge 2343 of the fourth groove region 2340. The loss of the filler material 3000 in liquid state from an edge (the outer edge 2343 of the annular region) of the filler placement region 2370 may be prevented on the connection-reinforcing surface 2300. In addition, the filler material 3000 in liquid state may flow along the plurality of fourth grooves 2341, so that the filler material 3000 in liquid state may be more uniformly applied to the connection-reinforcing surface 2300.

It should be understood that a shape and a size of a cross-section (e.g., a cross-section perpendicular to a length of a fourth groove 2341) of the at least one of the plurality of fourth grooves 2341 may be similar to a shape and a size of a cross-section (e.g., a cross-section perpendicular to a length of a third groove 2331) of the at least one of the plurality of third grooves 2331. Additional details about the shape and the size of a cross-section of the at least one of the plurality of fourth grooves 2341 may be found in relevant descriptions about the plurality of grooves 2381. The fourth groove region 2340 may increase an area of a region that includes the grooves, prevent a loss of the filler material 3000, and increase the uniformity of the distribution of the filler material 3000 in liquid state to the connection-reinforcing surface 2300, thereby effectively improving the connection strength of the braze joint that connects the first portion 1100 (e.g., the substrate 2200) to the second portion 1200 (e.g., the base body 2100).

Figure 9:
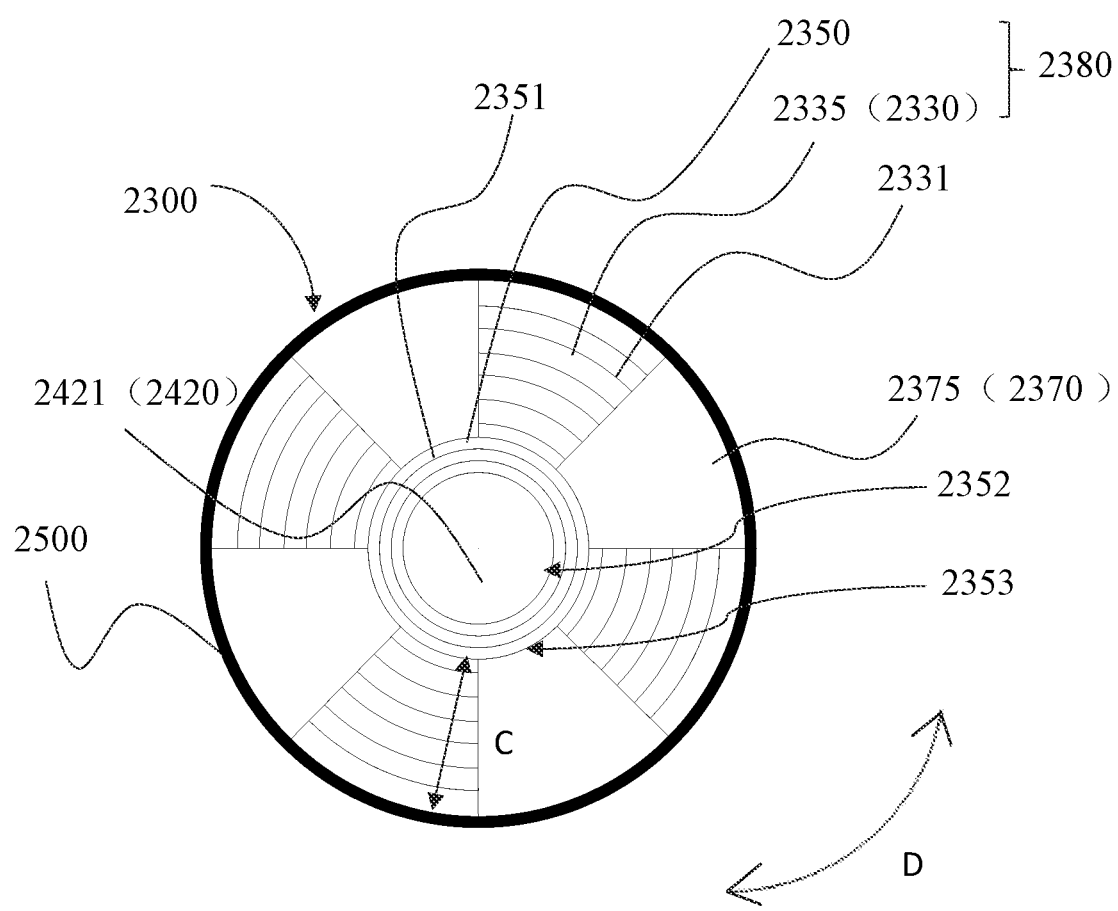
FIG. 9 is a schematic diagram illustrating an exemplary connection-reinforcing surface according to some embodiments of the present disclosure.

FIG. 9 is a schematic diagram illustrating an exemplary connection-reinforcing surface according to some embodiments of the present disclosure. The connection-reinforcing surface 2300 as illustrated in FIG. 9 is similar to the connection-reinforcing surface 2300 as illustrated in FIG. 7a except that in addition to the structural components of the connection-reinforcing surface 2300 as illustrated in FIG. 7a, the connection-reinforcing surface 2300 as illustrated in FIG. 9 may include a fifth groove region 2350. The fifth groove region 2350 may be of an annular shape that includes a plurality of fifth grooves 2351. At least one of the plurality of fifth grooves 2351 may be of an annular shape and may surround an inner edge 2352 of the fifth groove region 2350. The fifth groove region 2350 may surround the second opening 2421. The annular region that is formed by the plurality of third groove sub-regions 2335 and the plurality of filler placement sub-regions 2375 may surround the fifth groove region 2350. The filler material 3000 in liquid state may flow from an edge of the filler placement region 2370 that is located at the inner edge 2352 of the annular region into the fifth groove regions 2350. The filler material 3000 in liquid state may flow along the plurality of fifth grooves 2351.

In some embodiments, a shape of an inner edge 2352 of the fifth groove region 2350 may match a shape of the second opening 2421. For example, when the second opening 2421 is of a circular shape, the inner edge 2352 of the fifth groove region 2350 may be of a circular shape. In some embodiments, a shape of an outer edge 2353 of the fifth groove region 2350 may match a shape of the inner edge 2352 of the annular region where the filler placement region 2370 locates. For example, when the outer edge 2353 of the annular region is of the circular shape, the outer edge 2353 of the annular region and the outer edge 2353 of the fifth groove region 2350 may be concentric circles.

In some embodiments, the at least one of the plurality of fifth grooves 2351 may be of a shape of a curve or a zigzag.

The at least one of the plurality of fifth grooves 2351 may be of an annular shape, such as a circular-ring shape, a rectangular-ring shape, or an irregular-ring shape. In some embodiments, the at least one of the plurality of fifth grooves 2351 may extend along the circumferential direction of the brazing structure 1000. In some embodiments, when the fifth groove region 2350 is of a circular-ring shape, the at least one of the plurality of fifth grooves 2351 may extend along the circumferential direction (e.g., the direction indicated by arrow D in FIG. 9) of the fifth groove region 2350. In some embodiments, when the brazing structure 1000 is the anode target plate 2000, the at least one of the plurality of fifth grooves 2351 may extend along the circumferential direction of the anode target plate 2000. In some embodiments, the circumferential direction of the anode target plate 2000 may be the same as the circumferential direction of the fifth groove region 2350.

In some embodiments, the plurality of fifth grooves 2351 may be arranged at intervals from the inside of the fifth groove region 2350 to the outside of the fifth groove region 2350. In some embodiments, when the fifth groove region 2350 is of a circular-ring shape, the plurality of fifth grooves 2351 may be arranged at intervals along a radial direction (e.g., the direction indicated by arrow C in FIG. 9) of the fifth groove region 2350. In some embodiments, when the brazing structure 1000 is the anode target plate 2000, the plurality of fifth grooves 2351 may be arranged at intervals along the radial direction of the anode target plate 2000. In some embodiments, the radial direction of the anode target plate 2000 may be the same as the radial direction of the fifth groove region 2350.

The arrangement of the plurality of fifth grooves 2351 surrounding the inner edge 2352 of the fifth groove region 2350 may effectively prevent the filler material 3000 in liquid state from overflowing from the second opening 2421 when the filler material 3000 in liquid state flows from the outer edge of the connection-reinforcing surface 2300 to the inner edge of the connection-reinforcing surface 2300. When the substrate 2200 and/or the base body 2100 include a through-hole 2400, a loss of the filler material 3000 in liquid state from an edge (the inner edge 2352 of the annular region) of the filler placement region 2370 on the connection-reinforcing surface 2300 may be prevented. In addition, the filler material 3000 in liquid state may flow along the plurality of fifth grooves 2351, so that the filler material 3000 in liquid state may be more uniformly applied to the connection-reinforcing surface 2300.

It should be understood that a shape and a size of a cross-section (e.g., a cross-section perpendicular to a length of a fifth groove 2351) of the at least one of the plurality of fifth grooves 2351 may be similar to a shape and a size of a cross-section (e.g., a cross-section perpendicular to a length of a third groove 2331) of the at least one of the plurality of third grooves 2331. Additional details about the shape and the size of a cross-section of the at least one of the plurality of fifth grooves 2351 may be found in relevant descriptions about the groove 2381. The fifth groove region 2350 may increase an area of a region that includes the grooves, prevent a loss of the filler material 3000, and increase the uniformity of the distribution of the filler material 3000 in liquid state to the connection-reinforcing surface 2300, thereby effectively improving the connection strength of the braze joint that connects the first portion 1100 (e.g., the substrate 2200) to the second portion 1200 (e.g., the base body 2100).

In some embodiments, to prevent a loss of the filler material 3000 from the brazing structure 1000, the brazing structure 1000, or a portion thereof (e.g., the first portion 1100, the second portion 1200 of the brazing structure 1000), may include a blocking component. For instance, the blocking component may be set on the connection-reinforcing surface 2300. The blocking component may be set where the filler material 3000 may flow out of a boundary of the brazing structure 1000, or a portion thereof (e.g., a boundary of the first portion 1100, a boundary of the second portion 1200). In some embodiments, when the connection-reinforcing surface 2300 only includes the plurality of third groove sub-regions 2335, the blocking component (e.g., the bulging rim 2500) may be arranged along an edge of the second opening 2421 and/or along the outer edge of the connection-reinforcing surface 2300. FIG. 7a and FIG. 7b only show the bulging rim 2500 arranged along an edge of the second opening 2421. In some embodiments, when the connection-reinforcing surface 2300 includes the third groove region 2330 and the fourth groove region 2340, to prevent a loss of the filler material 3000 in liquid state from the inner edge of the filler placement region 2370, the blocking component may be arranged along an edge of the annular region that is away from the fourth groove region 2340, the annual region including the filler placement region 2370. For example, as shown in FIG. 8, when the fourth groove region 2340 is located on the outside of and surrounds the annular region that includes the filler placement region 2370, the blocking component (e.g., the bulging rim 2500) may be arranged along the edge of the second opening 2421. In some embodiments, when the connection-reinforcing surface 2300 includes the third groove region 2330 and the fifth groove region 2350, to prevent a loss of the filler material 3000 in liquid state from the outer edge of the filler placement region 2370, the blocking component may be arranged along an edge of the annular region that includes the filler placement region 2370 away from the fifth groove region 2350. For example, as shown in FIG. 9, when the third groove region 2330 surrounds the second opening 2421, and the annular region that includes the filler placement region 2370 surrounds the fifth groove region 2350, the blocking component (e.g., the bulging rim 2500) may be arranged along the outer edge of the connection-reinforcing surface 2300.

FIG. 10 is a schematic diagram illustrating an exemplary connection-reinforcing surface according to some embodiments of the present disclosure. The connection-reinforcing surface 2300 as illustrated in FIG. 10 is similar to the connection-reinforcing surface 2300 as illustrated in FIG. 9 except that in addition to the structural components of the connection-reinforcing surface 2300 as illustrated in FIG. 9, the connection-reinforcing surface 2300 as illustrated in FIG. 10 may include a sixth groove region 2360. The sixth groove region 2360 may be of an annular shape that includes a plurality of sixth grooves 2361. At least one of the plurality of sixth grooves 2361 may be of an annular shape and may surround an inner edge 2362 of the sixth groove region 2360. The sixth groove region 2360 may surround the annular region that is formed by the plurality of third groove sub-regions 2335 and the plurality of filler placement sub-regions 2375. A shape, an arrangement manner, an effect, or the like, of the sixth groove region 2360 may be similar to the fourth groove region 2340. More details may be found elsewhere in the present disclosure. See, e.g., FIG. 10 and relevant descriptions of the sixth groove region 2360 of FIG. 10.

In some embodiments, a width (i.e., a distance between an inner edge 2362 and an outer edge 2363 of the sixth groove region 2360 that is of an annular shape) of the sixth groove region 2360 may be (substantially) equal to a width (i.e., a distance between an inner edge 2352 and an outer edge 2353 of the fifth groove region 2350 that is of an annular shape) of the fifth groove region 2350. In some embodiments, a width of the sixth groove region 2360 (i.e., a distance between an inner edge 2362 and an outer edge 2363 of the sixth groove region 2360 that is of an annular shape) may be not equal to a width (i.e., a distance between an inner edge 2352 and an outer edge 2353 of the fifth groove region 2350 that is of an annular shape) of the fifth groove region 2350. For example, the width of the sixth groove region 2360 may be greater than or less than the width of the fifth groove region 2350.

It should be understood that a shape and a size of a cross-section (e.g., a cross-section perpendicular to a length of a sixth groove 2361) of the at least one of the plurality of sixth grooves 2361 may be similar to a shape and a size of a cross-section (e.g., a cross-section perpendicular to a length of a third groove 2331) of the at least one of the plurality of third grooves 2331. Additional details about the shape and the size of a cross-section of the at least one of the plurality of sixth grooves 2361 may be found in relevant descriptions about the plurality of grooves 2381.

In some embodiments, to facilitate a uniform distribution of the filler material 3000 in liquid state on the connection-reinforcing surface 2300, areas of at least two of the plurality of filler placement sub-regions 2375 may be (substantially) equal. For example, an area of each of the plurality of filler placement sub-regions 2375 may be (substantially) equal. In some embodiments, areas of at least two of the plurality of third groove sub-regions 2335 may be (substantially) equal. For example, an area of each of the plurality of third groove sub-regions 2335 may be equal. As another example, an area of the each of the plurality of filler placement sub-regions 2375 may be (substantially) equal to an area of the each of the plurality of third groove sub-regions 2335.

In some embodiments, as shown in FIGS. 7a-10, widths of at least some of the plurality of third grooves 2331 may be (substantially) equal along the radial direction (e.g., the direction indicated by arrow C in FIGS. 7a-10) of the brazing structure 1000 (e.g., the anode target plate 2000) so that the flow of the filler material 3000 in liquid state in these third grooves 2331 may be subject to (substantially) the same capillary force and/or resistance. As used herein, a pair of adjacent grooves refers to two grooves extending along a same direction and being located next to each other without a groove extending along the same direction located in between. In some embodiments, the plurality of fourth grooves 2341 may be set to cause a distance between any pair of adjacent fourth grooves 2341 of the plurality of fourth grooves 2341 to be (substantially) equal along the radial direction (e.g., the direction indicated by arrow C in FIG. 8) of the brazing structure 1000 (e.g., the anode target plate 2000). In some embodiments, the plurality of fifth grooves 2351 may be set to cause a distance between a pair of adjacent fifth grooves 2351 of the plurality of fifth grooves 2351 to be (substantially) equal along the radial direction (e.g., the direction indicated by arrow C in FIG. 9) of the brazing structure 1000 (e.g., the anode target plate 2000). In some embodiments, the plurality of sixth grooves 2361 may be set to cause a distance between a pair of adjacent sixth grooves 2361 of the plurality of sixth grooves 2361 to be (substantially) equal along the radial direction (e.g., the direction indicated by arrow C in FIG. 10) of the brazing structure 1000 (e.g., the anode target plate 2000). The plurality of third grooves 2331, the plurality of fourth grooves 2341, the plurality of fifth grooves 2351, and/or the plurality of sixth grooves 2361 may be more uniformly distributed on the connection-reinforcing surface 2300, so that the filler material 3000 may be more uniformly applied to the connection-reinforcing surface 2300.

In some embodiments, an area of the groove region 2380 may be greater than or equal to 40% of an area of the connection-reinforcing surface 2300. In some embodiments, when the connection-reinforcing surface 2300 only includes the first groove region 2310 as illustrated in FIG. 3, FIG. 4, and FIG. 6, an area of the first groove region 2310 may be greater than or equal to 40% of the area of the connection-reinforcing surface 2300. In some embodiments, when the connection-reinforcing surface 2300 includes the first groove region 2310 and the second groove region 2320 as illustrated in FIG. 5, a sum of an area of the first groove region 2310 and an area of the second groove region 2320 may be greater than or equal to 40% of the area of the connection-reinforcing surface 2300. In some embodiments, when the connection-reinforcing surface 2300 only includes the third groove region 2330 as illustrated in FIG. 7a, an area of the third groove region 2330 may be greater than or equal to 40% of the area of the connection-reinforcing surface 2300. In some embodiments, when the connection-reinforcing surface 2300 includes the third groove region 2330 and the fourth groove region 2340 as illustrated in FIG. 8, a sum of an area of the third groove region 2330 and an area of the fourth groove region 2340 may be greater than or equal to 40% of the area of the connection-reinforcing surface 2300. In some embodiments, when the connection-reinforcing surface 2300 includes the third groove region 2330 and the fifth groove region 2350 as illustrated in FIG. 9, a sum of an area of the third groove region 2330 and an area of the fifth groove region 2350 may be greater than or equal to 40% of the area of the connection-reinforcing surface 2300. In some embodiments, when the connection-reinforcing surface 2300 includes the third groove region 2330, the fifth groove region 2350, and the sixth groove region 2360 as illustrated in FIG. 10, a sum of an area of the third groove region 2330, an area of the fifth groove region 2350, and an area of the sixth groove region 2360 may be greater than or equal to 40% of the area of the connection-reinforcing surface 2300. The groove region may facilitate the generation of the capillary effect on the filler material 3000 in liquid state, which in turn may facilitate the suction of the filler material 3000 into and the flow thereof in the gap between the first portion and the second portion, thereby resulting in a strong braze joint that provides a stable connection between the first portion 1100 (e.g., the substrate 2200) and the second portion 1200 (e.g., the base body 2100).

Figure 11:
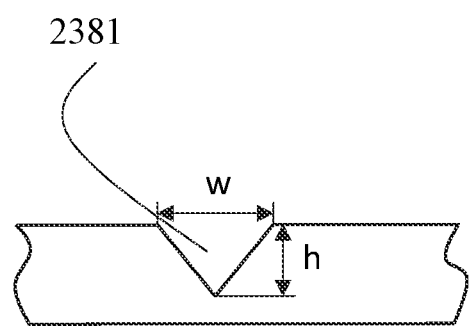
FIG. 11 is a schematic diagram illustrating a cross-section of a groove according to some embodiments of the present disclosure.

FIG. 11 is a schematic diagram illustrating a cross-section of a groove according to some embodiments of the present disclosure. As shown in FIG. 11, in some embodiments, to improve the processing efficiency, at least one of a plurality of grooves 2381 may be a groove of a V-shape. As used herein, a groove of a V-shape refers to a groove whose cross-section (a cross-section perpendicular to a length direction along which the at least one of the plurality of grooves 2381 extends) is of a V-shape. In some embodiments, a cross-section perpendicular to a length direction along which the at least one of the plurality of grooves 2381 extends) of the at least one of the plurality of grooves 2381 may be of a U-shape, a rectangular shape, a trapezoid shape, an inverted trapezoid shape, or the like. The descriptions of the cross-section of the at least one of the plurality of grooves 2381 may be applicable to a cross-section of the at least one of the plurality of first grooves 2311, a cross-section of the at least one of the plurality of second grooves 2321, a cross-section of the at least one of the plurality of third grooves 2331, a cross-section of the at least one of the plurality of fourth grooves 2341, a cross-section of the at least one of the plurality of fifth grooves 2351, and a cross-section of the at least one of the plurality of sixth grooves 2361.

In some embodiments, as shown in FIG. 11, a depth h of each of the plurality of grooves 2381 (e.g., the plurality of first grooves 2311 shown in FIGS. 3-6, the plurality of second grooves 2321 shown in FIG. 5, the plurality of third grooves 2331 shown in FIGS. 7a-10, the plurality of fourth grooves 2341 shown in FIG. 8, the plurality of fifth grooves 2351 shown in FIGS. 9-10, and the plurality of sixth grooves 2361 shown in FIG. 10) on a groove region (e.g., the first groove region 2310 shown in FIGS. 3-6, the second groove region 2320 shown in FIG. 5, the third groove region 2330 shown in FIGS. 7a-10, the fourth groove region 2340 shown in FIG. 8, the fifth groove region 2350 shown in FIGS. 9-10, and the sixth groove region 2360 shown in FIG. 10) of the groove region 2380 may be in the range from 0.1 mm to 0.5 mm. As used herein, the depth of a groove 2381 refers to a maximum distance (the distance h shown in FIG. 11) from a top opening of the groove 2381 to a bottom of the grooves 2381. If the depths of the plurality of grooves 2381 are too small or too large, the capillary effect may be insufficient to draw melted filler material 3000 into and/or facilitate the flow thereof in the grooves 2381, which is sub-optimal for the formation of a braze joint for providing a stable connection between the first portion 1100 (e.g., the substrate 2200) and the second portion 1200 (e.g., the base body 2100) of the brazing structure 1000. The depth of the each of the plurality of grooves 2381 mentioned above may effectuate not only a strong capillary effect, but also a smooth flow of the filler material 3000 in liquid state in the plurality of grooves 2381. The descriptions of the depth of the each of the plurality of grooves 2381 may be applicable to a depth of each of the plurality of first grooves 2311, a depth of each of the plurality of second grooves 2321, a depth of each of the plurality of third grooves 2331, a depth of each of the plurality of fourth grooves 2341, a depth of each of the plurality of fifth grooves 2351, and a depth of each of the plurality of sixth grooves 2361. In some embodiments, a depth h of each of at least a part of the plurality of grooves 2381 (e.g., the plurality of first grooves 2311 shown in FIGS. 3-6, the plurality of second grooves 2321 shown in FIG. 5, the plurality of third grooves 2331 shown in FIGS. 7a-10, the plurality of fourth grooves 2341 shown in FIG. 8, the plurality of fifth grooves 2351 shown in FIGS. 9-10, and the plurality of sixth grooves 2361 shown in FIG. 10) on a groove sub-region (e.g., the first groove region 2310 shown in FIGS. 3-6, the second groove region 2320 shown in FIG. 5, the third groove region 2330 shown in FIGS. 7a-10, the fourth groove region 2340 shown in FIG. 8, the fifth groove region 2350 shown in FIGS. 9-10, and the sixth groove region 2360 shown in FIG. 10) of the groove region 2380 may be (substantially) the same. In some embodiments, depths h of at least two of the plurality of grooves 2381 may be different.

In some embodiments, as shown in FIG. 11, a width w of each of the plurality of grooves 2381 (e.g., the plurality of first grooves 2311 shown in FIGS. 3-6, the plurality of second grooves 2321 shown in FIG. 5, the plurality of third grooves 2331 shown in FIGS. 7a-10, the plurality of fourth grooves 2341 shown in FIG. 8, the plurality of fifth grooves 2351 shown in FIGS. 9-10, and the plurality of sixth grooves 2361 shown in FIG. 10) on a groove region (e.g., the first groove region 2310 shown in FIGS. 3-6, the second groove region 2320 shown in FIG. 5, the third groove region 2330 shown in FIGS. 7a-10, the fourth groove region 2340 shown in FIG. 8, the fifth groove region 2350 shown in FIGS. 9-10, and the sixth groove region 2360 shown in FIG. 10) of the groove region 2380 may be in the range from 0.1 mm to 0.5 mm. As used herein, the width of a groove 2381 refers to a distance (the distance w shown in FIG. 11) between edges on two sides of a top opening of the each of the plurality of grooves 2381. The width of a groove 2381 may extend in a direction (substantially) perpendicular to a distance in which the depth of the groove 2381 extends. If the widths of the plurality of grooves 2381 are too large or too small, the capillary effect may be insufficient to draw melted filler material 3000 into and/or facilitate the flow thereof the plurality of grooves 2381, which is sub-optimal for the formation of a braze joint for providing a stable connection between the first portion 1100 (e.g., the substrate 2200) and the second portion 1200 (e.g., the base body 2100) of the brazing structure 1000. The width of the each of the plurality of grooves 2381 mentioned above may effectuate not only a strong capillary effect, but also a smooth flow of the filler material 3000 in liquid state in the plurality of grooves 2381. The descriptions of the width of the each of the plurality of grooves 2381 may be applicable to a width of each of the plurality of first grooves 2311, a width of each of the plurality of second grooves 2321, a width of each of the plurality of third grooves 2331, a width of each of the plurality of fourth grooves 2341, a width of each of the plurality of fifth grooves 2351, and a width of each of the plurality of sixth grooves 2361. In some embodiments, a width w of each of at least a part of the plurality of grooves 2381 (e.g., the plurality of first grooves 2311 shown in FIGS. 3-6, the plurality of second grooves 2321 shown in FIG. 5, the plurality of third grooves 2331 shown in FIGS. 7a-10, the plurality of fourth grooves 2341 shown in FIG. 8, the plurality of fifth grooves 2351 shown in FIGS. 9-10, and the plurality of sixth grooves 2361 shown in FIG. 10) on a groove sub-region (e.g., the first groove region 2310 shown in FIGS. 3-6, the second groove region 2320 shown in FIG. 5, the third groove region 2330 shown in FIGS. 7a-10, the fourth groove region 2340 shown in FIG. 8, the fifth groove region 2350 shown in FIGS. 9-10, and the sixth groove region 2360 shown in FIG. 10) of the groove region 2380 may be (substantially) the same. In some embodiments, widths w of at least two of the plurality of grooves 2381 may be different.

Based on the exemplary configurations of the connection-reinforcing surface 2300 in the embodiments of the present disclosure, the strength of the connection between the first portion 1100 and the second portion 1200 may be effectively improved. Compared with a brazing structure that does not include a groove region, the brazing structure 1000 illustrated in the embodiments may provide a connection-reinforcing surface including a groove region and a filler placement region, which may significantly increase a maximum shear stress that the first portion 1100 and the second portion 1200 may sustain. Taking the brazing structure as the anode target plate as an example, when the filler material is metal zirconium, the maximum shear stress that a braze joint between the substrate 2200 and the base body 2100 according to embodiments in the present disclosure may sustain may increase by 20% or higher (e.g., increasing from 15 mpa to 20 mpa) compared with a braze joint formed without the grooves.

It should be understood that FIGS. 3-11 and relevant descriptions take the brazing structure 1000 as the anode target plate 2000 as an example to achieve the illustration purpose. However, according to the illustration mentioned above, the brazing structure may be other various components (e.g., a hard alloy cutter head, a drilling bit, a heat exchanger, a microwave waveguide component, an electronic vacuum device, or the like). The exemplary illustration of FIGS. 3-11 may not intend to limit the scope of the present disclosure.

Another aspect of the embodiments of the present disclosure may also provide an X-ray tube. An anode target plate of the X-ray tube may include the brazing structure illustrated in the embodiments mentioned above. The anode target plate including the brazing structure may ensure a stable working and a long service life of the X-ray tube.

Another aspect of the embodiments of the present disclosure may also provide a process 12000 for connecting a brazing structure by brazing. According to the process 12000, the brazing structure illustrated in the embodiments mentioned above may be produced. In some embodiments, the process 12000 may be applied to the vacuum brazing. In some embodiments, the anode target plate 2000 may include the brazing structure 1000 as described elsewhere in the present disclosure. As shown in FIG. 12, the process may include the following operations.

In operation 12100, the filler material 3000 in solid state may be placed in the filler placement region 2370 of the brazing structure 1000.

In some embodiments, the filler material 3000 may include at least one of zirconium, manganese, or nickel, or the like, or an alloy thereof.

In some embodiments, the filler material 3000 in solid state may cover the filler placement region 2370. That is, the filler material 3000 in solid state may fill the filler placement region 2370. In some embodiments, a shape of the filler material 3000 in solid state may (substantially) match a shape of the filler placement region 2370. In some embodiments, an area of the filler material 3000 in solid state may (substantially) be the same as an area of the filler placement region 2370. It should be understood that a shape of the filler material 3000 in solid state (substantially) matching a shape of the filler placement region 2370 may refer to the shape of the filler material 3000 in solid state being the same as or substantially the same as the shape of the filler placement region 2370. In some embodiments, an area of the filler material 3000 in solid state may be the same as or substantially the same as an area of the filler placement region 2370.

In operation 12200, at least one of the filler material 3000, the first portion 1100 (e.g., the substrate 2200) of the brazing structure, or the second portion 1200 (e.g., the base body 2100) of the brazing structure may be heated to melt the filler material 3000. The melted filler material 3000 may be allowed at least to flow into the groove region 2380 along the plurality of grooves 2381 so as to form a braze joint to connect the first portion 1100 (e.g., the substrate 2200) and the second portion 1200 (e.g., the base body 2100).

For instance, the filler material 3000 may be heated directly so as to melt the filler material 3000. As another example, the second portion 1200 (e.g., the base body 2100) and/or the first portion 1100 (e.g., the substrate 2200) may be heated, and the heated second portion 1200 (e.g., the base body 2100) and/or the heated first portion 1100 (e.g., the substrate 2200) may transmit the heat to the filler material 3000 to melt the filler material 3000. As a further example, the filler material 3000, the second portion 1200 (e.g., the base body 2100), and/or the first portion 1100 (e.g., the substrate 2200) may be heated to melt the filler material 3000. In some embodiments, a heating temperature may be determined based on the melting temperature of the selection of the filler material 3000. For example, when the filler material 3000 is a manganese-based filler material or a nickel-based filler material, the heating temperature may be greater than 450° C. (e.g., 500° C., 600° C., etc.).

In some embodiments, after the filler material 3000, the second portion 1200 (e.g., the base body 2100), and/or the first portion 1100 (e.g., the substrate 2200) are heated so as to melt the filler material 3000, a heat preservation may be performed on the filler material 3000 in liquid state, the second portion 1200 (e.g., the base body 2100), and/or the first portion 1100 (e.g., the substrate 2200) to slow down the cooling thereof and/or the solidification of the filler material 3000, thereby to improve the capillary effect and/or the flow of the filler material 3000. The time of the heat preservation may be determined based on a size of each part of the brazing structure (e.g., a length of the groove 2381), the composition of the filler material 3000, the heat capacity of the filler material 3000, a flowing parameter (e.g., viscosity) of the filler material 3000 in liquid state, or the like. For example, when the size of the each part of the brazing structure is large (e.g., a length of the groove 2381 is large), the time of heat preservation may be longer. In some embodiments, the time of heat preservation may be in the range from 35 min to 70 min.

In operation 12300, the melted filler material 3000, the first portion 1100 (e.g., the substrate 2200), and the second portion 1200 (e.g., the base body 2100) may be cooled so as to allow the filler material 3000 to solidify to form the braze joint to connect the first portion 1100 (e.g., the substrate 2200) and the second portion 1200 (e.g., the base body 2100).

During the operation 12200, diffusion of elements may occur between the melted filler material 3000 and the second portion 1200 (e.g., the base body 2100), and/or between the melted filler material 3000 and the first portion 1100 (e.g., the substrate 2200). During the cooling process in operation 12300, the melted filler material 3000 may solidify gradually so as to form a stable braze joint between the first portion 1100 (e.g., the substrate 2200) and the second portion 1200 (e.g., the base body 2100).

In some embodiments, the cooling of the melted filler material 3000, the first portion 1100 (e.g., the substrate 2200), and the second portion 1200 (e.g., the base body 2100) may be achieved by forced-air cooling.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A brazing structure, comprising:
    a first portion and a second portion, at least one of the first portion or the second portion including a connection-reinforcing surface, wherein
    the connection-reinforcing surface includes a groove region and a filler placement region, the filler placement region being configured to hold a filler material in solid state before brazing, and the groove region including a plurality of grooves where the filler material flows into after being melted,
    and
    the first portion and the second portion are connected by a braze joint formed by the filler material.

2. The brazing structure of claim 1, wherein
    the groove region includes a first groove region, the first groove region including a plurality of first grooves, the first groove region surrounding the filler placement region, or the filler placement region surrounding the first groove region; and at least one end of at least one of the plurality of first grooves is located at an edge of the first groove region that abuts the filler placement region.

3. The brazing structure of claim 2, wherein the first groove region is of an annular shape having an inner edge and an outer edge, two ends of the at least one of the plurality of first grooves being located at the inner edge and the outer edge of the first groove region, respectively.

4. The brazing structure of claim 2, wherein the at least one of the first portion or the second portion includes a first through-hole, a first opening of the first through-hole being located on the connection-reinforcing surface.

5. The brazing structure of claim 4, wherein
the filler placement region is of an annular shape having an inner edge and an outer edge, the filler placement region being configured to surround the first opening, the first groove region) being configured d to surround the filler placement region;
a first end of each of the plurality of first grooves is located at the outer edge of the filler placement region; and
a second end of the each of the plurality of first grooves is located at an outer edge of the connection-reinforcing surface.

6. The brazing structure of claim 4, wherein
the filler placement region is of an annular shape having an inner edge and an outer edge, the first groove region being configured to surround the first opening, the filler placement region being configured to surround the first groove region;
a first end of each of the plurality of first grooves is located at an edge of the first opening; and
a second end of the each of the plurality of first grooves is located at the inner edge of the filler placement region.

7. The brazing structure of claim 6, wherein
the groove region includes a second groove region that is of an annular shape having an inner edge and an outer edge, the second groove region including a plurality of second grooves, two ends of at least one of the plurality of second grooves being located at the inner edge and the outer edge of the second groove region, respectively;
the second groove region is configured to surround the filler placement region;
a first end of each of the plurality of second grooves is located at the outer edge of the filler placement region; and
a second end of the each of the plurality of second grooves is located at an outer edge of the connection-reinforcing surface.

8. The brazing structure of claim 2, wherein
the filler placement region is of a circular shape having an outer edge;
the first groove region is configured to surround the filler placement region;
a first end of each of the plurality of first grooves is located at the outer edge of the filler placement region; and
a second end of the each of the plurality of first grooves is located at an outer edge of the connection-reinforcing surface.

9. The brazing structure of claim 1, wherein
the groove region includes a third groove region, the third groove region including a plurality of third groove sub-regions;

the filler placement region includes a plurality of filler placement sub-regions, the plurality of filler placement sub-regions being arranged at intervals such that each pair of adjacent filler placement sub-regions is spaced apart by one of the plurality of third groove sub-regions; and
each of the plurality of third groove sub-regions includes a plurality of third grooves, two ends of at least one of the plurality of third grooves being located at two edges of the third groove sub-region that abuts the pair of adjacent filler placement sub-regions, respectively.

10. The brazing structure of claim 9, wherein at least one of the first portion or the second portion includes a second through-hole, a second opening of the second through-hole being located on the connection-reinforcing surface.

11. The brazing structure of claim 10, wherein the third groove region and the filler placement region are configured to form an annular region that surrounds the second opening.

12. The brazing structure of claim 11, wherein
the connection-reinforcing surface includes a fourth groove region;
the fourth groove region is of an annular shape and includes a plurality of fourth grooves;
at least one of the plurality of fourth grooves is of an annular shape that surrounds an inner edge of the fourth groove region; and
the fourth groove region is configured to surround the annular region.

13. The brazing structure of claim 10, wherein
the groove region includes a fifth groove region, the fifth groove region being of an annular shape and including a plurality of fifth grooves;
at least one of the plurality of fifth grooves is of an annular shape that surrounds an inner edge of the fifth groove region;
the third groove region and the filler placement region are configured to form an annular region;
the fifth groove region is configured to surround the second opening; and
the annular region is configured to surround the fifth groove region.

14. The brazing structure of claim 13, wherein
the groove region includes a sixth groove region, the sixth groove region being of an annular shape and including a plurality of sixth grooves;
at least one of the plurality of sixth grooves is of an annular shape that surrounds an inner edge of the sixth groove region; and
the sixth groove region is configured to surround the annular region.

15. The brazing structure of claim 14, wherein the at least one of the plurality of sixth grooves extends along a circumferential direction of the brazing structure.

16. An X-ray tube, comprising an anode target plate, wherein the anode target plate includes a brazing structure of claim 1.

17. The X-ray tube of claim 16, wherein
the first portion of the brazing structure provides a substrate of the anode target plate, and
the second portion of the brazing structure provides a base body.

18. The brazing structure of claim 1, wherein the filler placement region, the plurality of grooves, or a combination of the filler placement region and the plurality of grooves encloses a center of the connection-reinforcing surface.

19. The brazing structure of claim 1, an extension direction of anyone of the plurality of grooves is parallel to a surface of the first portion or the second portion the filler placement region is located on.

20. A method for generating a brazing structure by brazing, wherein
- the brazing structure includes a first portion and a second portion, at least one of the first portion or the second portion including a connection-reinforcing surface; and
- the connection-reinforcing surface includes a groove region and a filler placement region, the filler placement region being configured to hold a filler material in solid state before brazing, the groove region including a plurality of grooves, the method including:
- placing the filler material in solid state in the filler placement region;
- heating at least one of the filler material, the first portion of the brazing structure, or the second portion of the brazing structure to melt the filler material; and
- allowing the melted filler material to flow into the groove region along the plurality of grooves so as to form a braze joint to connect the first portion and the second portion.

* * * * *